US 12,537,919 B2

(12) United States Patent
Russ et al.

(10) Patent No.: US 12,537,919 B2
(45) Date of Patent: Jan. 27, 2026

(54) REMOTE MEDICAL IMAGING SYSTEM PROCESSING

(71) Applicant: LightLab Imaging, Inc., Westford, MA (US)

(72) Inventors: Tomas Russ, Chelmsford, MA (US); Steven M. Stromski, Windham, NH (US); Samir Farah, Norwood, MA (US); Mark Hoeveler, Eliot, ME (US); Douglas Tatosian, West Boylston, MA (US)

(73) Assignee: LightLab Imaging, Inc., Westford, MA (US)

( * ) Notice: Subject to any disclaimer, the term of this patent is extended or adjusted under 35 U.S.C. 154(b) by 67 days.

(21) Appl. No.: 18/388,425

(22) Filed: Nov. 9, 2023

(65) Prior Publication Data
US 2024/0163404 A1     May 16, 2024

Related U.S. Application Data

(60) Provisional application No. 63/424,636, filed on Nov. 11, 2022.

(51) Int. Cl.
    *H04N 7/18*          (2006.01)
    *A61B 90/00*      (2016.01)
    *G16H 40/67*      (2018.01)

(52) U.S. Cl.
    CPC .............. *H04N 7/183* (2013.01); *A61B 90/37* (2016.02); *G16H 40/67* (2018.01)

(58) Field of Classification Search
    CPC ........ H04N 7/183; A61B 90/37; A61B 8/565; A61B 5/0066; A61B 5/0084; A61B 5/1076; A61B 8/12; A61B 5/0013; G16H 40/67

(Continued)

(56) References Cited

U.S. PATENT DOCUMENTS

| | | |
|---|---|---|
| 9,610,064 B2 | 4/2017 | Adler et al. |
| 11,119,552 B2 | 9/2021 | Spencer et al. |

(Continued)

OTHER PUBLICATIONS

Intellinet Network Solutions: "8-Port Gigabit Ethernet PoE+ Switch with PoE Passthrough One PD PoE Port with 95 W Power Input, Seven PSE PoE Ports, PoE Power Budget up to 120 W, IEEE 802.3at/af Compliant, DIN-Rail Mount Part No. 561624", Jan. 26, 2021 (Jan. 26, 2021), pp. 1-5, XP093128618, Retrieved from the Internet: <URL:https://web.archive.org/web/2021012600> 5737if_/ https://s3.amazonaws.com/assets.mh int/downloads/62787/561624_datasheet_english.pdf [retrieved on Feb. 7, 2024].

(Continued)

*Primary Examiner* — John W Miller
*Assistant Examiner* — Omer Khalid
(74) *Attorney, Agent, or Firm* — Lerner David LLP

(57) ABSTRACT

The disclosure relates to a modular data acquisition and processing system for obtaining intravascular data, such as image data, for a patient. The modular system includes acquisition components in a patient procedure environment in communication with a processing engine in a remote environment. The remote processing engine may be used with different types of data acquisition systems. The modular system further includes a hub in the patient procedure environment, which maintain a persistent connection with the remote processing engine while enabling fast and reliable coupling to data acquisition components.

27 Claims, 15 Drawing Sheets

(58) Field of Classification Search
USPC .......................................................... 348/77
See application file for complete search history.

(56) References Cited

U.S. PATENT DOCUMENTS

| | | | |
|---|---|---|---|
| 11,141,063 B2 | 10/2021 | Kemp et al. | |
| 2013/0120296 A1* | 5/2013 | Merritt ................ | G06F 3/04883 |
| | | | 345/173 |
| 2014/0187965 A1* | 7/2014 | Reiter .................... | A61B 8/445 |
| | | | 600/467 |
| 2020/0125152 A1* | 4/2020 | Spencer .................. | G06F 1/266 |

OTHER PUBLICATIONS

International Search Report including the Written Opinion for Application No. PCT/US2023/037100 dated Mar. 1, 2024, 18 pgs.

\* cited by examiner

REMOTE MEDICAL IMAGING SYSTEM PROCESSING

CROSS-REFERENCE TO RELATED APPLICATIONS

This application claims the benefit of the filing date of U.S. Provisional Patent Application No. 63/424,636 filed Nov. 11, 2022, the disclosure of which is hereby incorporated herein by reference.

BACKGROUND

Interventional cardiologists incorporate a variety of diagnostic tools during catheterization procedures in order to plan, guide, and assess therapies. Thus, there are many systems used in a hospital catheterization lab to diagnose and treat vascular problems, mainly in the coronary and peripheral arteries. These tools typically include optical coherence tomography (OCT), intravascular ultrasound, (IVUS), fractional flow reserve (FFR), and angiography. Intravascular OCT, IVUS, and FFR are invasive catheter-based systems that measure physical features of the blood vessels using optical (OCT) or ultrasound (IVUS) signals, or collect physiological responses from said vessels using pressure data (FFR) in a region of interest. Chief among them is the angiographic system that enables the insertion of minimally invasive catheters through radial or femoral arteries and guide them to the area of interest using X-rays and puffs of contrast solutions. Angiography is a noninvasive x-ray imaging method that collects data from outside the body during injection of a radio-opaque contrast fluid.

During the data acquisition procedure, a guide catheter is inserted into a patient to an area of interest in the patient's intravascular system. Once the guide catheter is in place, other catheters can be inserted concentrically to perform diagnostic and treatment procedures. For example, an intravascular imaging system can use an optical or ultrasonic catheter to map the region of interest and determine the level of narrowing and tissue composition of an artery using OCT or IVUS.

In order to perform a procedure, the catheter must be connected to a series of peripherals and processing engines. These peripherals and processing engines tend to be complex and expensive. Moreover, in the catheter lab and especially at the patient bed, space is extremely limited, but the high data rate requirements drive the design where the data acquisition system is directly connected to the high-speed internal computer bus. For example, in the application of OCT to intravascular imaging, the time available for data acquisition is limited by the blood clearance requirements. This limited time, combined with large amounts of data collected at once to create a 3D image results in extremely high data acquisition rates.

BRIEF SUMMARY

The disclosure generally relates to the field of devices suitable for use in the fields of medical treatment and diagnostics and more specifically the architecture of systems in a catheter laboratory. The present disclosure relates to an intravascular modular imaging acquisition and processing system where the high-speed data acquisition system and the processing unit are in different enclosures and connected by a high-speed digital network. Additionally, the present disclosure relates to a modular configuration to reduce clutter in the patient procedure environment and provide for interchangeability of imaging systems.

One aspect of the disclosure includes a portable digital imager for processing intravascular diagnostic data, the engine comprising a first interface coupling the digital imager to a set of imaging peripherals, an analog imager configured to receive analog image data from the imaging peripherals, a digitizer in communication with the analog imager to convert the analog image data into digital image data, a controller in communication with the digitizer, the controller in communication with the digitizer, the controller adapted to convert the digital image signal to serial communication data, and a second interface coupling the digital imager to a communication link configured to transmit the serial communication data to a remote processing engine.

The portable digital imager further may further include a housing, wherein, the analog imager, the digitizer and the controller are within the housing. At least some of the set of imaging peripherals may reside outside of the housing. The imaging peripherals are further connected to an imaging tool. The portable digital imager may be removably connected to the processing engine. The second interface coupling the portable digital imager to the remote processing engine provides high-speed, serial communications.

Another aspect of the disclosure relates to a modular image acquisition and processing system comprising a remote processing engine positioned outside of a patient procedure environment, a user interface positioned within the patient procedure environment and adapted to receive operational commands from a user, a hub positioned within the patient procedure environment. The hub may comprise a first connection port configured to maintain a persistent connection to the remote processing engine positioned outside of the patient procedure environment, and a further connection port configured for connection to a portable digital imager in the patient procedure environment. The system further comprises a set of imaging peripherals and a portable digital imager, comprising a first interface coupling the digital imager to a set of imaging peripherals, an analog imager configured to receive analog image data from the imaging peripherals, a digitizer in communication with the analog imager to convert the analog image data into digital image data, a controller in communication with the digitizer, the controller adapted to convert the digital image signal to serial communication data, and a second interface coupling the digital imager to a communication link configured to transmit the serial communication data to a remote processing engine.

The hub may further comprise at least one second connection port configured to maintain a persistent coupling to one or more monitors and controls in the patient procedure environment. The system may further comprise at least one light indicator on at least the remote processing engine, the hub, the portable digital imager, or the set of imaging peripherals. The light indicators may provide at least the connectivity or power status of at least the remote processing engine, the hub, the portable digital imager, or the set of imaging peripherals. The user interface comprises a monitor on a mobile cart, wherein the monitor is adapted to display at least intravascular image data, and wherein said monitor communicated with the processing engine via the same controller that interfaces with the digitizer. The user interface further comprises a keyboard and a mouse coupled to the monitor. The monitor may be a touch screen. The set of imaging peripherals may be positioned on a mobile cart. The set of imaging peripherals and the digital imager may be positioned on the mobile cart. The set of imaging peripherals, the digital imager and the monitor may be positioned on the mobile cart. The set of imaging peripherals may be positioned on a support. The set of imaging peripherals and the digital imager may be positioned on a support.

The hub may be positioned on a support. The hub may be positioned underneath the support. The second interface of the digital imager connects to the further connection port of the hub. The hub may receive power from the processing engine through the first connection port.

The set of imaging peripherals may comprise at least one of an imaging system engine, or a light source or an interferometer. The set of imaging peripherals may comprise at least one of an ultrasound imaging system, an ultrasound source, or an ultrasound transducer. The set of imaging peripherals may comprise at least one blood pressure sensor, a blood temperature sensor, or a blood flow sensor.

The hub may further comprise a power control, wherein the power control can detect a connection at the further connection port. The system may further comprise a hub extender. The hub extender may further comprise a power control, wherein the power control can detect a connection at the further connection port Another aspect of the disclosure includes a hub positioned within a patient procedure environment, comprising a first connection port configured to maintain a persistent connection to a remote processing engine positioned outside of the patient procedure environment, at least one second connection port configured to maintain a persistent coupling to one or more monitors or controls in the patient procedure environment, a third connection port configured for connection to a portable digital imager in the patient procedure environment, wherein the third connection port may contain a power control that is configured to detect a connection at the third connection port. The hub may further comprise a communications control.

The hub may receive power from the remote processing engine through the first connection port. The hub may be positioned on a support in the patient procedure environment. The hub may be removably attached to a hub mount on the support. The hub may be positioned under the procedure table in the patient procedure environment. The hub may further comprise a hub extender. The third connection port is configured for fixed connection to the hub extender, wherein the hub extender may comprise a removable connection to the portable digital imager. The hub extender may be positioned on a support in the patient procedure environment. The hub may be removably attached to a hub mount on the support. The hub may be positioned under a support in the patient procedure environment.

DETAILED DESCRIPTION

The disclosure relates to various systems and components thereof for use in a catheter lab or other lab environment to facilitate collection of vascular data from a patient. The vascular data may be related to the patient's cardiovascular or peripheral vascular system and can include image data, pressure data, and/or other types of data as described herein. The disclosure provides for a modular system, where some components may be persistently coupled while other are temporarily coupled during a procedure. The modularity of the system allows for ease of movement of the components and interchangeability of components. It further allows for multiple types of data acquisition to be performed by the system, such as by exchanging some components of the system while other components remain. For example, to accommodate different types of data acquisition, such as different types of imaging, processing components may remain while data acquisition components of a first type are exchanged with data acquisition components of a second type.

Figure 1:
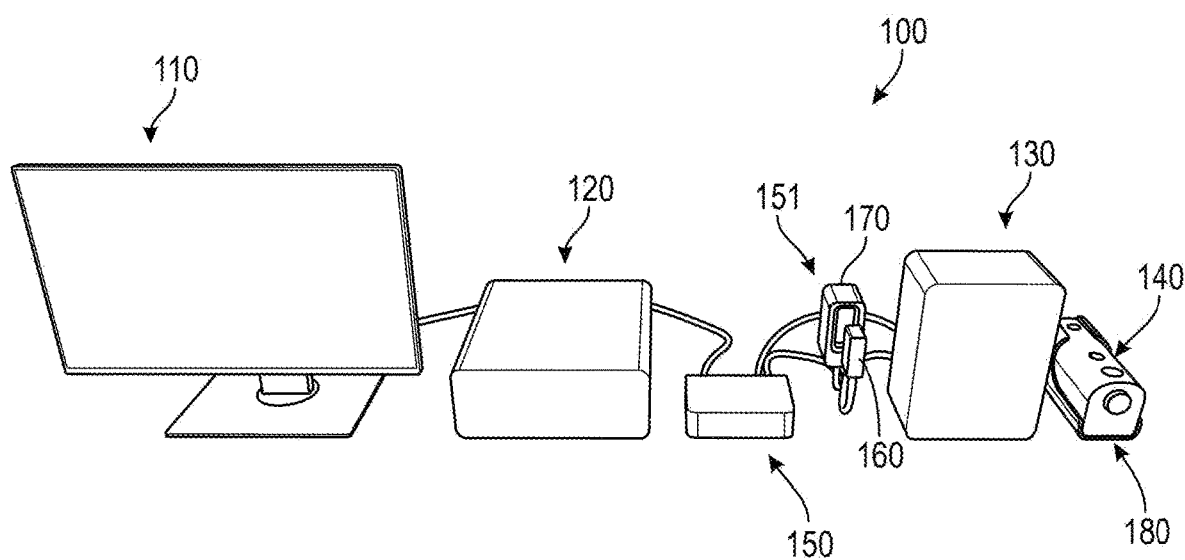
FIG. 1 illustrates an example configuration of a modular image acquisition and processing system according to aspects of the disclosure.

FIG. 1 illustrates the components and connections of a modular imaging acquisition and processing system 100. The modular imaging acquisition and processing system 100 may include a user interface 110, a processing engine 120, a digital imager 130, a hub 150, a hub extender 151 including a plug 160 and a socket 170, and imaging peripherals 140 a holster 180 for the imaging peripherals 140.

The system 100 can be used to collect vascular data from a patient. For example, the system 100 may be part of an intravascular imaging system that further includes an image collection apparatus, such as an optical coherence tomography (OCT) probe, intravascular ultrasound (IVUS) probe, micro-OCT probe, near-infrared spectroscopy (NIRS) apparatus, or any of a variety of other intravascular data collection devices. Various elements of the system 100 may be located in a patient procedure environment, such as a catheter lab, in the vicinity of the patient or proximal to the patient. In some examples, certain components of the system 100 can be positioned remotely from the patient, such as in remote portions of the patient procedure environment that are not near the patient, or in a different room relative to the patient. For example, the processing engine 120 may reside in a remote room, such as a control room, equipment closet, or other another location, while the other components of the system are positioned in the patient procedure environment. The ability to place the processing engine 120 in a separate location from the other components of the system 100 allows for convenience and flexibility in fitting complex data acquisition equipment into limited spaces around a patient table or bed in the patient procedure environment.

The user interface 110 may be used to receive operator commands, such as for controlling the data acquisition system, and to display information, such as information related to the acquired vascular data. As such, the user interface 110 may include an input/output interface, such as a touchscreen, display, microphone, keyboard, mouse, a joystick, a control panel, etc. According to some examples, the user interface 110 may include one or more gesture recognition devices, such as a camera for recognizing hand gestures by the operator, an accelerometer, gyroscope, or the like. While FIG. 1 illustrates the user interface 110 as a display, it should be understood that the user interface 110 also includes input devices, such as—without limitation—keyboards, mice, touch screens, and joysticks, multiple displays or other input/output devices. There may be multiple user interfaces supporting one system. The user interface 110 may be directly or indirectly coupled with the processing engine 120 and the digital imager 130. The user interface 110 may be positioned in the vicinity of or proximal to a patient or a patient support. When configured as a system, the user interface 110 may be located within the sterile field of the patient procedure environment. Alternatively, the user interface 110 may be located outside of the sterile field of the patient procedure environment. In some embodiments, the user interface 110 may be docked on a mobile apparatus, such as a wheeled cart, that also includes other components, such as the imaging peripherals 140 and digital imager 130.

Figure 5A:
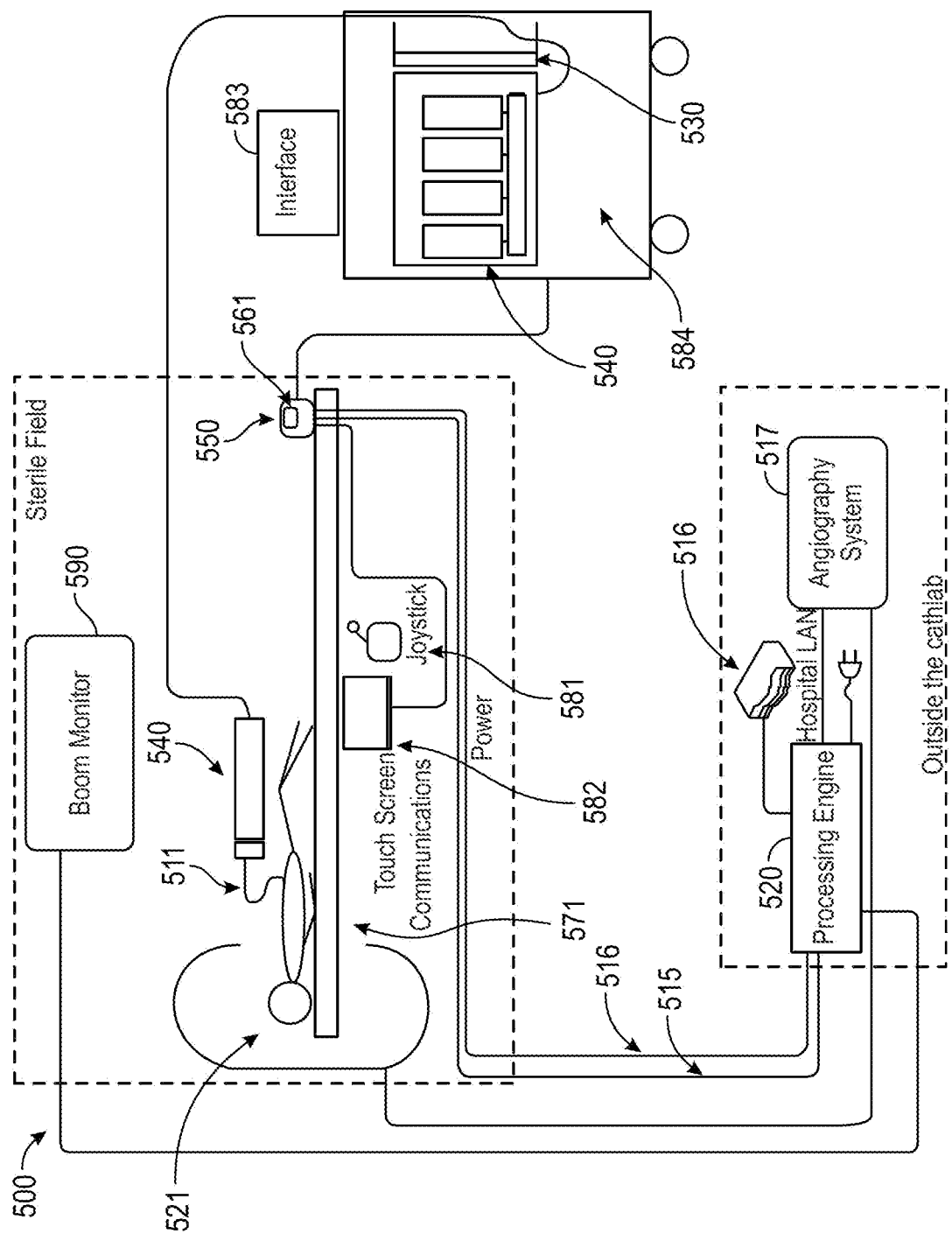
FIG. 5A is a pictorial diagram illustrating an example modular image acquisition and processing system with a mobile apparatus according to aspects of the disclosure.
Figure 5B:
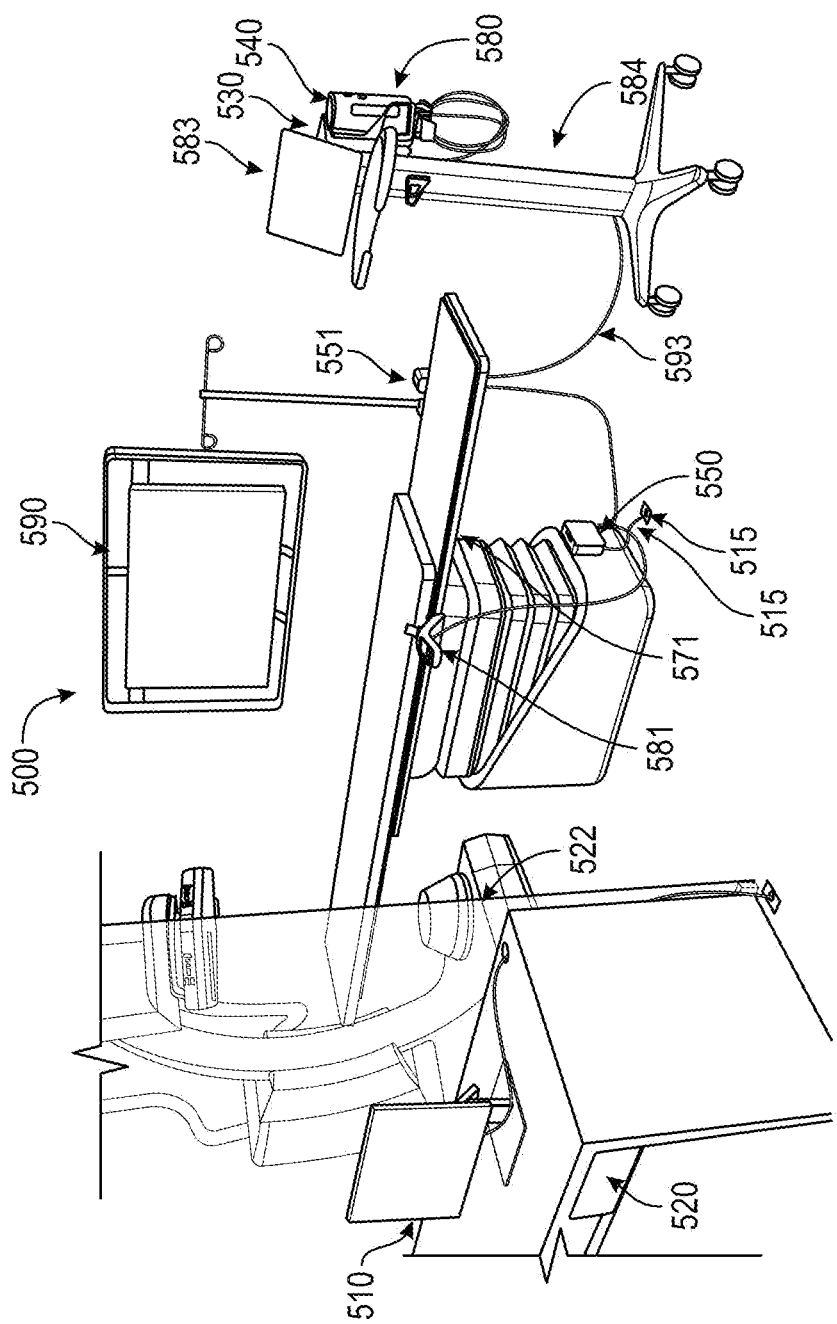
FIG. 5B is a diagram of the system of FIG. 5A.
Figure 5C:
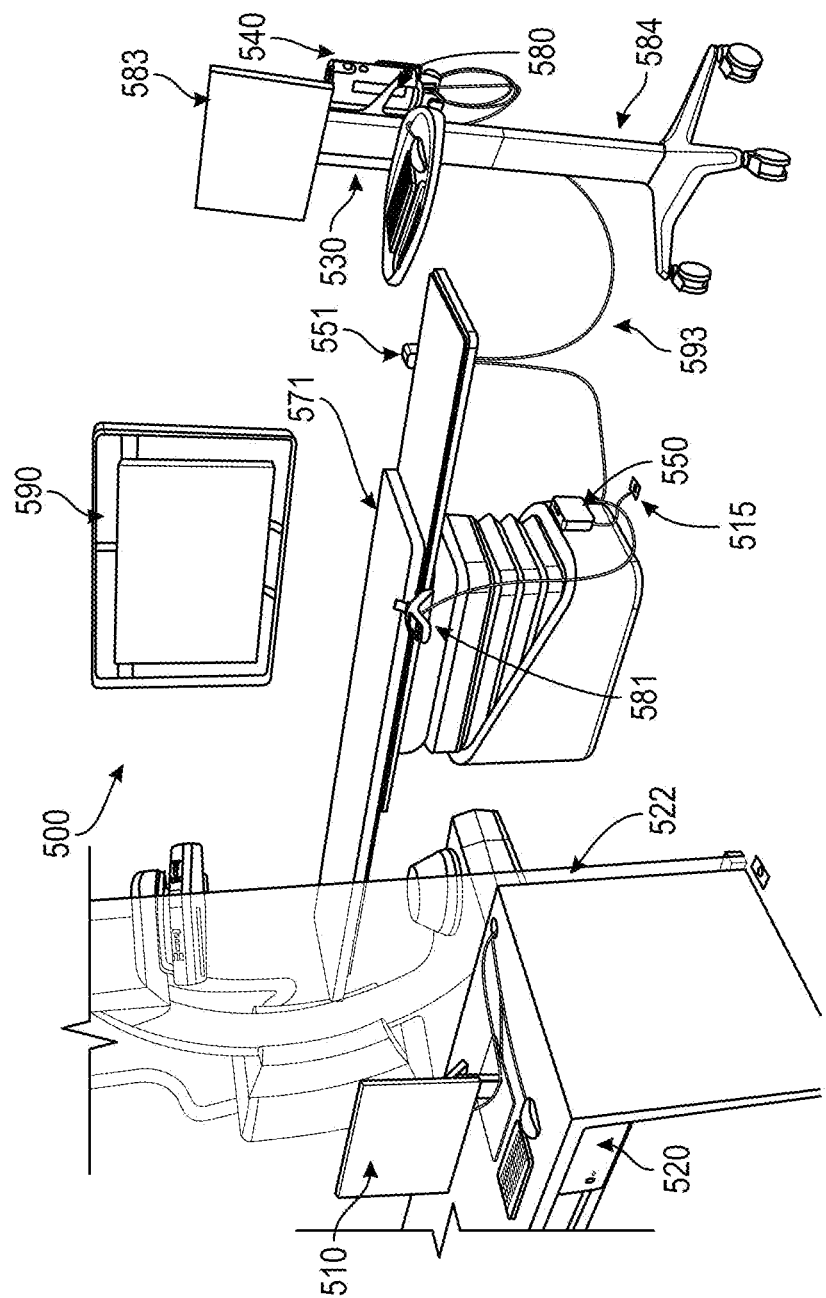
FIG. 5C is another diagram of the system of FIG. 5A.

The modular system may be set up with multiple user interfaces for use by one or multiple users. For example, while one user interface 110 is illustrated in FIG. 1, the modular system may be set up with two or three or more user interfaces. By way of example, a first user interface may include a sterile environment user interface within the sterile field of the patient procedure room. Such sterile environment user interface may be operated by a physician within the sterile field of the patient procedure room, such as to control an intravascular imaging tool or other data acquisition equipment. A second user interface may include a remote user interface. The remote user interface may reside within a separate area from the patient procedure environment, such as in a remote room. In some examples, the remote user interface may reside in a same remote area as the processing engine and/or an angiography system. The remote user interface may be operated by, for example, a technician. In some examples, the system may feature a single power control button within the remote area. The power button may be on the processing engine. A third user interface may include for example, a cart user interface in the patient procedure room. The cart user interface may be connected to the digital imager and/or imaging peripherals. The cart user interface may be docked on a mobile cart, as depicted in FIG. 5A-5C to be described more fully in turn below. The user interfaces may each include any one or more of a variety of types of input/output devices adapted to receive user input and provide output, such as a monitor, a mouse, a keyboard, a touchscreen, a joystick, etc. The user interfaces may be communicatively coupled with each other. The user interfaces may display the same images and information to the different users, or each user interface may display different information, such as different images, different input options, etc. While a few examples of different types of user interfaces are described herein, it should be understood that other types of user interfaces, to be operated by different types of users or to facilitate different types of input/output, may additionally or alternatively be included in the modular system.

The processing engine 120 may include one or more processors in communication with memory, buses, controllers, and other components suitable for processing data. The processing engine 120 may be equipped with software implementations, computer program instructions or instructions configured to process and calculate physical, anatomical and physiological data. For example, the processing engine may receive raw data from the data acquisition system and convert the raw data into images, graphs, measurements, tissue characteristics or other output. The raw data may include, for example, signals received from the data acquisition system, such as optical signals, ultrasound signals, etc. According to some examples, the processing engine may be connected to a hospital network and receive data from other systems, such as angiography data from an angiography system.

The processing engine 120 may be coupled to the user interface 110 and/or other components of the system 100 via one or more communication links. The one or more communication links may be configured to transmit data, commands, or other types of signals. According to some examples, the one or more communication links may include an optical communication link. The communication links may be configured to transmit data at high bandwidth, such as 1 Gbps (gigabits per second) to 60 Gbps or more. This high speed allows data to be transmitted from the imager to the processing engine in real-time as it is acquired, without the need of compression or preprocessing at the patient end. As the processing engine 120 may be located in a separate control room remote from a catheter patient procedure environment in which the other components of the system are positioned, the communication links may extend over significant distances, such as tens or hundreds of feet.

The processing engine 120 may be persistently coupled to one or more components, such as the hub 150, in the patient procedure environment. In this regard, the communication link may be permanently fixed underground, under flooring, along beams or other structures between the remote room in which the processing engine 120 is stored and the patient procedure environment. In this regard, the communication link is less likely to become damaged by movement, touch, or other interaction that may otherwise occur if the communication link were mostly exposed, and therefore preserves a quality of signals transmitted over the communication link. Similarly, by maintaining a persistent coupling between the processing engine 120 and the hub 150, a possibility of interrupted signal or improper coupling is reduced in comparison to a system where the communication link is connected before each procedure and disconnected afterward. Furthermore, significant time may be saved by maintaining the connection between the processing engine 120 and the other system 100 components in the patient procedure environment, as opposed to reconnecting all components before each procedure. In addition to communicating with the hub 150 and peripherals as described, the processing engine 120 can also supply power to the peripherals eliminating the need for a separate power supply in the patient procedure area.

While the processing engine 120 is illustrated in FIG. 1 in connection with a single system 100, in some examples the processing engine 120 may be used with multiple data acquisition systems at a different or a same time. For example, the processing engine 120 may be positioned in a remote room in communication with a first hub in a first patient procedure environment and also in communication with a second hub in a second patient procedure environment. According to some examples, each patient procedure environment may be used for different types of procedures. For example, each of the first and second procedure environments may be adapted to obtain vascular data using IVUS, OCT, angiography, or other types of data acquisition. As such, the processing engine 120 may be configured to process various types of signals, including optical signals, ultrasound signals, etc.

According to some examples, the system may be used in connection with pressure measurements, such as to compute fractional flow reserve (FFR) measurements using a pressure measurement device, such as guidewire having one or more pressure and/or temperature sensors thereon. The pressure and/or temperature measurement device may be wired or wirelessly coupled to the processing engine 120 through one or more other components of the system 100.

According to some examples, the processing engine 120 may be configured to perform comparison and co-registration of multiple different data acquisition types, such as OCT and/or IVUS images with angiographic images. For example, the data collection system can be configured to interface with an angiography device or with a hospital data network wherein angiographic data is stored.

The digital imager 130 may be a modular component that receives analog image data from the image catheter through the imaging peripherals 140. The digital imager transmits image data between the imaging system and the processing engine 120. The contents and functionality of the digital imager is described in more detail below in connection with FIG. 2. In some configurations there may be multiple digital imagers to receive data from various imaging modalitie. For example, one digital imager may be configured to receive data from OCT modalities and a second digital imager may be configured to receive data from IVUS modalities. The first OCT digital imager may be replaced with a second digital imager in the modular system. In some examples, the first and second digital imagers may be used simultaneously.

The imaging peripherals 140 may include any of a variety of electronic components, which may vary based on a type of imaging being performed. The imaging peripherals 140 may be systems configured to route the signals to the catheter to control the catheter movement. In the case of the OCT system, these systems may be the fiber optic rotary join, motor controllers and catheter loading mechanisms. In the case of IVUS system, these systems may be a rotating catheter head. Typically, the imaging peripherals are in a separate housing from the digital imager allowing the imaging peripherals to be moved into the sterile field in order to perform the procedure. In some examples, the imaging peripherals may include various elements such as an electro-optic rotary coupler, rotational motor, linear travel stage, ultrasound controller, and motion controller. The imaging peripherals may include at least one blood pressure sensor or blood temperature sensor or a blood flow sensor. The imaging peripherals may be connected to an imaging catheter and its controls in the patient procedure environment. In some examples, the imaging peripherals may be anchored to a holster 180 within the patient procedure environment, as described in more detail below. The imaging peripherals 140 are shown in FIG. 1 as being within a housing adapted to fit within holster 180. Such housing may also include other mechanisms, such as a coupling for an imaging probe, controls for operating the imaging probe, etc. In other examples, not shown, the imaging peripherals 140 may be housed within a same housing as other components, such as the digital imager 130.

The system may be suitable for handling multiple imaging modalities. For OCT, which uses interferometry to determine distances and other related measurements, the imaging peripherals may include a light source such as a laser, and an optical interferometer in communication with an opto-electrical (O/E) converter. In some example systems, imaging peripherals may include a reference arm optical path, a sample arm switch path. In some examples, the system may further comprise a set of catheter controls, such as a series of motors to rotate the catheter and translate it back across the region of interest. In some examples, the system may include a computer to recreate the artery geometry and tissue characteristics using special algorithms and transform routines.

For IVUS, that uses ultrasound to determine distances and other related measurements, the peripherals may be piezo-electric or capacitive micromachined transducers and associated signal processing elements, and motors to rotate and translate the catheter in some instances, or electrical drivers to engage transducers at different angles within the catheter.

The hub 150 may be a connection device adapted to communicatively couple multiple modular components. The hub 150 may be located within the patient procedure environment to facilitate connections to modules, such as the processing engine 120, that are outside of the patient procedure environment. In some examples, the hub 150 connects the processing engine 120 and the digital imager 130. The hub 150 may transmit power and data signals between the processing engine 120 and the digital imager 130. The hub 150 is described in more detail below in connection with FIGS. 3-5. The plug 160 and the socket 170 are components of a hub connection system. The hub connection system may facilitate a connection between the hub 150 and the digital imager 130. The plug 160 may be coupled to the digital imager 130, while the socket 170 extends from the hub 150. The plug 160 and socket 170 may each include a mating surface, such that a mating surface of the plug 160 is adapted to engage the mating surface of the socket 170. The hub connection system is described in more detail below in connection with FIG. 9.

The hub 150 may be connected to a hub extender 151. The hub extender 151 may serve to facilitate a connection further away from the hub 150. The hub extender may include the socket 170 configured to couple with the plug 160, as described above. The hub extender 151 is described in more detail below in connection with FIGS. 5B-5C.

Figure 2:
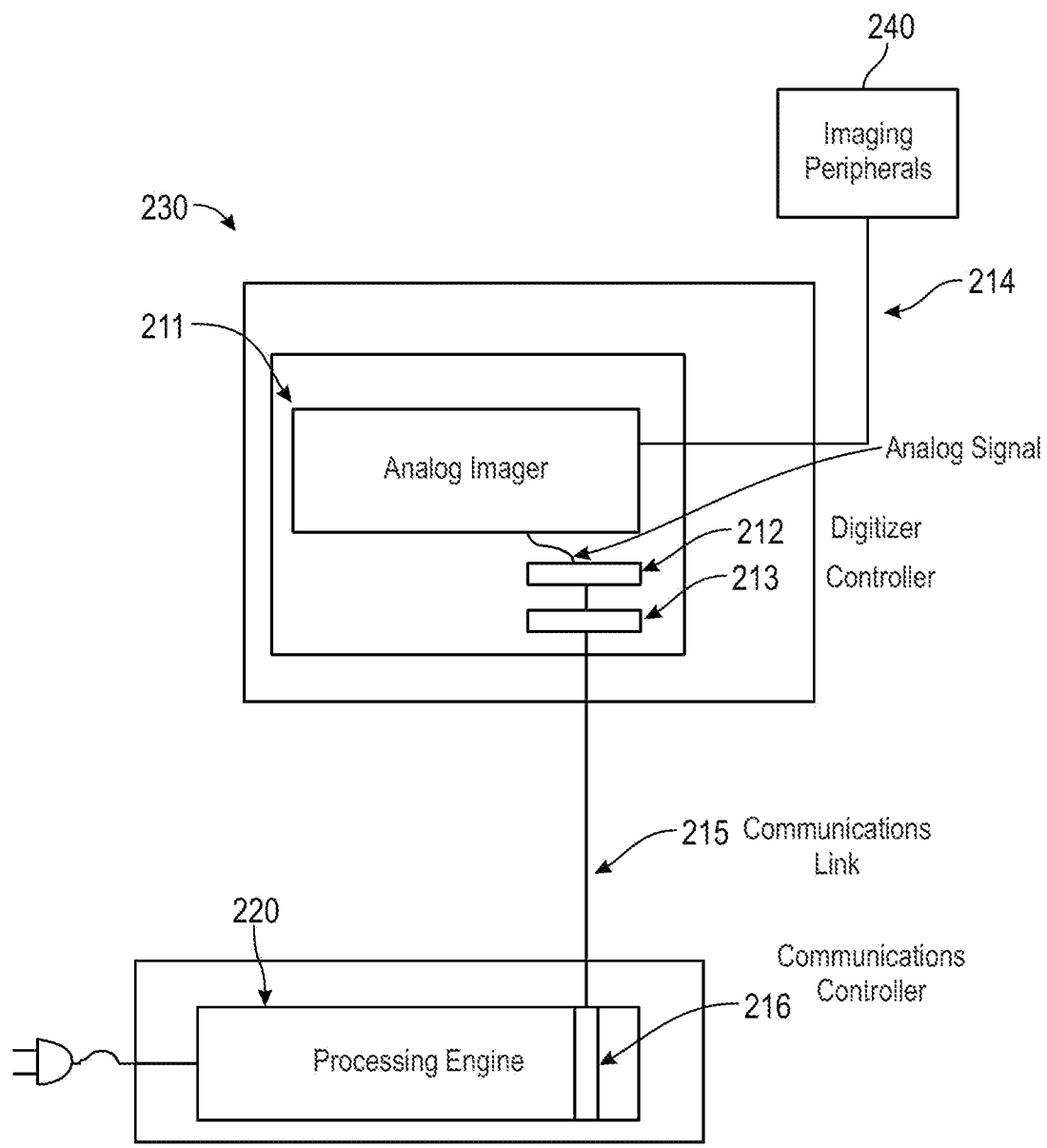
FIG. 2 illustrates a block diagram of an example imaging system according to aspects of the disclosure.

FIG. 2 illustrates details of the digital imager, here referenced as digital imager 230. The digital imager 230 may include an analog imager 211, a digitizer 212, a controller 213, an analog and/or digital link 214 coupling to imaging peripherals 240, and a digital communication link 215 that may carry power coupling to remote processing engine 220. In some embodiments, the analog imager 211, the digitizer 212, and the controller 213 may be contained in a single housing. The analog imager 211 may be the system that converts the images retrieved from the catheter into analog electrical signals. The analog imager 211 may include one or more of a tunable laser, fiber-optic interferometers, polarization controllers, opto-electrical converters, electro-optical converters, optical switches, electrical receivers and signal conditioners, and/or control systems for controlling these components. The imaging peripherals 240 may be systems configured to route the signals to the catheter to control the catheter movement. In the case of the OCT system, these systems may be the fiber optic rotary join, motor controllers and catheter loading mechanisms. In the case of IVUS system, these systems may be a rotating catheter head. The imaging peripherals may be in a separate housing from the digital imager allowing the imaging peripherals to be moved into the sterile field in order to perform the procedure. In another example, the imaging peripherals may be split wherein some of the imaging peripherals may be within the same housing as the digital imager and the rest are not within the same housing. In another example, the imaging peripherals may be in a housing outside of the digital imager. When the digital imager 230 is linked to the processing engine 220, where the processing engine 220 may be located in a separate control room.

In some embodiments, the digital imager 230 may be configured to be connected to the imaging peripherals 240 via an analog and/or digital link 214. The imaging peripherals 240 may be further connected to an imaging catheter and separate catheter controls. The imaging catheter may be inserted in the patient during a data acquisition procedure. The imaging catheter may be controlled by the imaging peripherals 240 and/or separate catheter controls. The imaging catheter obtains image data from the vessels of the patient. The image data may be transmitted to the digital imager 230 through the imaging peripherals 240 via the link 214. The image data may be transmitted from the imaging catheter as an analog signal.

The digital imager 230 may contain components for receiving and converting analog image data transmitted from the imaging catheter. The analog signal may be received by the analog imager 211. The analog signal may be transmitted to the digitizer 212 within the housing of the digital imager 230.

The digitizer 212 may digitize the analog signal within the digital imager. The digitizer 212 may sample the analog signal and convert the analog signal into a digital signal. In one example, the digitizer 212 may be configured to perform fast Fourier transforms (FFT) on OCT image data and/or ultrasound image data using a field programmable gate array (FPGA), digital signal processing (DSP) chip, application-specific integrated circuit (ASIC), or other digital logic device. Additional signal processing functionality, such as logarithmic scale compression and digital filtering, may also be incorporated onto the digitizer to reduce the burden on the processing engine. In another example, the digitized signals would be transmitted without conversion to the processing engine 220. The digital imager size may range from 15 inches or less in length, 8 inches or less in depth, and 12 inches or less in width. The size of the digitizer allows for the digital imager to be compact. One advantage of the compact size of the digital imager is to allow for portability facilitating easier interchangeability within the patient procedure environment.

The digitized data may be further processed by the controller 213. The controller may be configured to transform the digital image signal into a format compatible with a high-speed communications connection, such as communication link 215. The formatted image data is transmitted over the communications link 215 to the communications controller 216 of the remote processing engine 220. Due to the high-speed digital communication, the image data does not need to be compressed prior to transmitting to the processing engine 220.

In some examples, the communications link 215 may use Ethernet, Universal Serial Bus (USB), or Thunderbolt protocols. In some examples, the communications link 215 may allow for high-speed, serial communications between the digital imager 230 and the processing engine 220.

The communications controller 216 may be housed within the processing engine 220. The communications controller may be configured such that it receives the formatted, digitized data from the communications link 215. The communications controller may be further configured to convert the digitized signal to any of the protocols suitable for transmission. In addition, the communication controller may control the flow of power into the digital imager 230 coming from other components of the modular system, such as the hub 150 or the hub extender 151 (FIG. 1) or the processing engine 220. The communication controller may also send and receive other signals to/from the processing engine 220 in addition to the output from the digitizer 212, such as controls for the analog imager 212, the imaging peripherals 240 and video information, as described further below.

In conventional systems, the processing engine and the imager must reside in the same housing, due to the difficulty of extending a low-level analog signal long distances without losing strength of the signal or distorting the data. An image collection tool generates a large amount of image data, such as at the rate of 10 Gbps per second or more. This data rate typically necessitated the analog image data to be sent into the processing engine and digitized within the processing engine. Digitizing within the processing engine forces the processing engine and the digital imager to be co-located. Therefore, the processing engine needs to remain in the patient procedure room, or the analog imager signals need to extend long distances to reach a processing engine placed outside the patient procedure room. In the example described above, the digital imager 230 communicates with the processing engine 220 through a digital communications link in real-time, wherein the digitization of the image data or image signal occurs within the digital imager prior to transfer to the processing engine. Digitizing the of image data within the digital imager allows for the processing engine to be located remotely, thus reducing clutter in the procedure room.

Figure 3A:
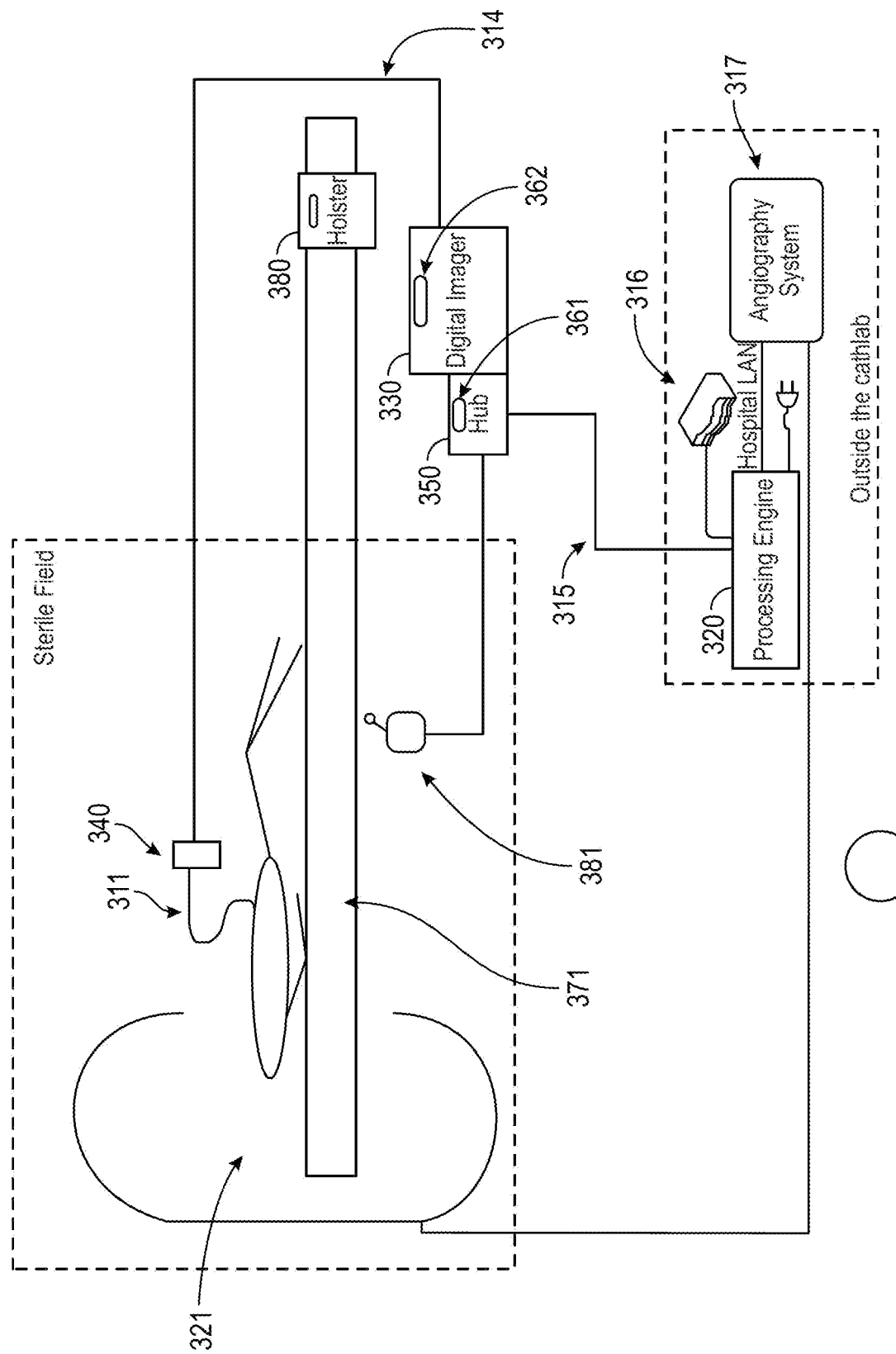
FIG. 3A is a pictorial diagram illustrating an example modular image acquisition and processing system with an integrated hub and digital imager apparatus according to aspects of the disclosure.
Figure 3B:
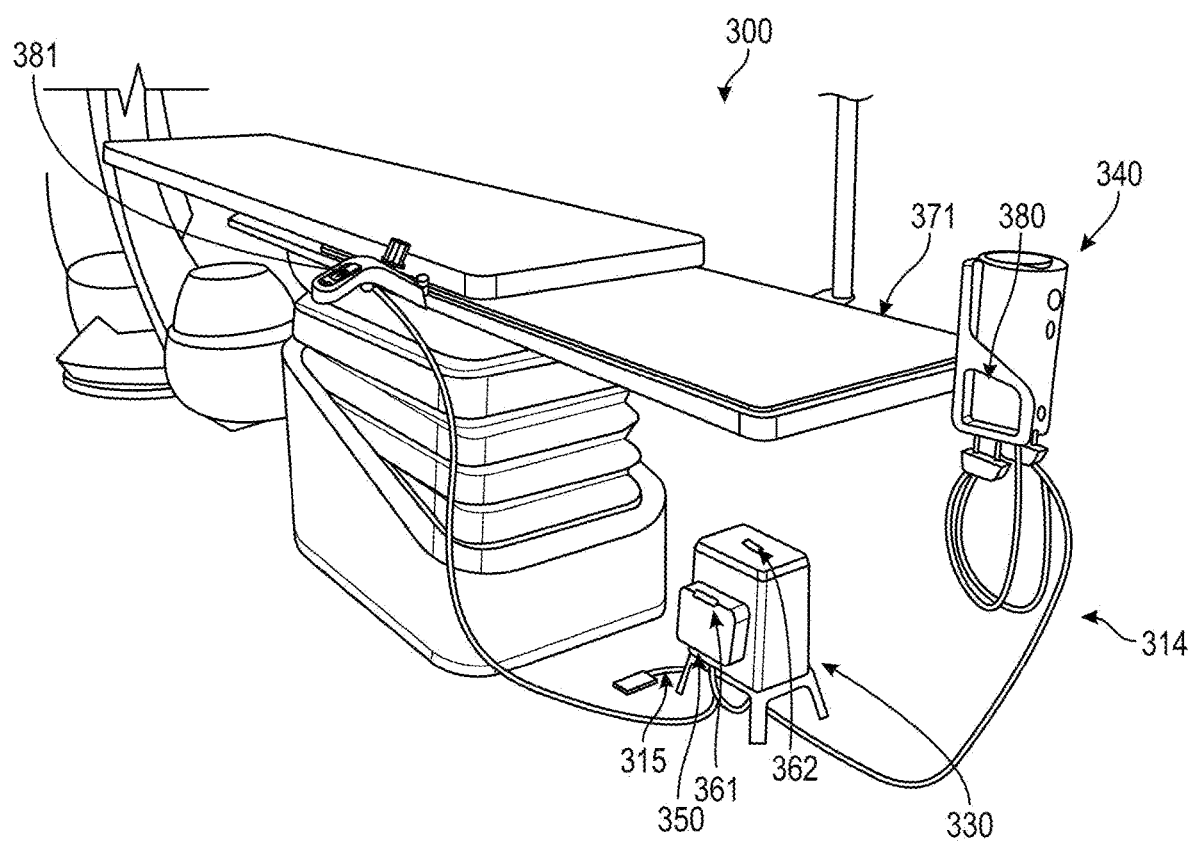
FIG. 3B is a diagram of the system of FIG. 3A.
Figure 3C:
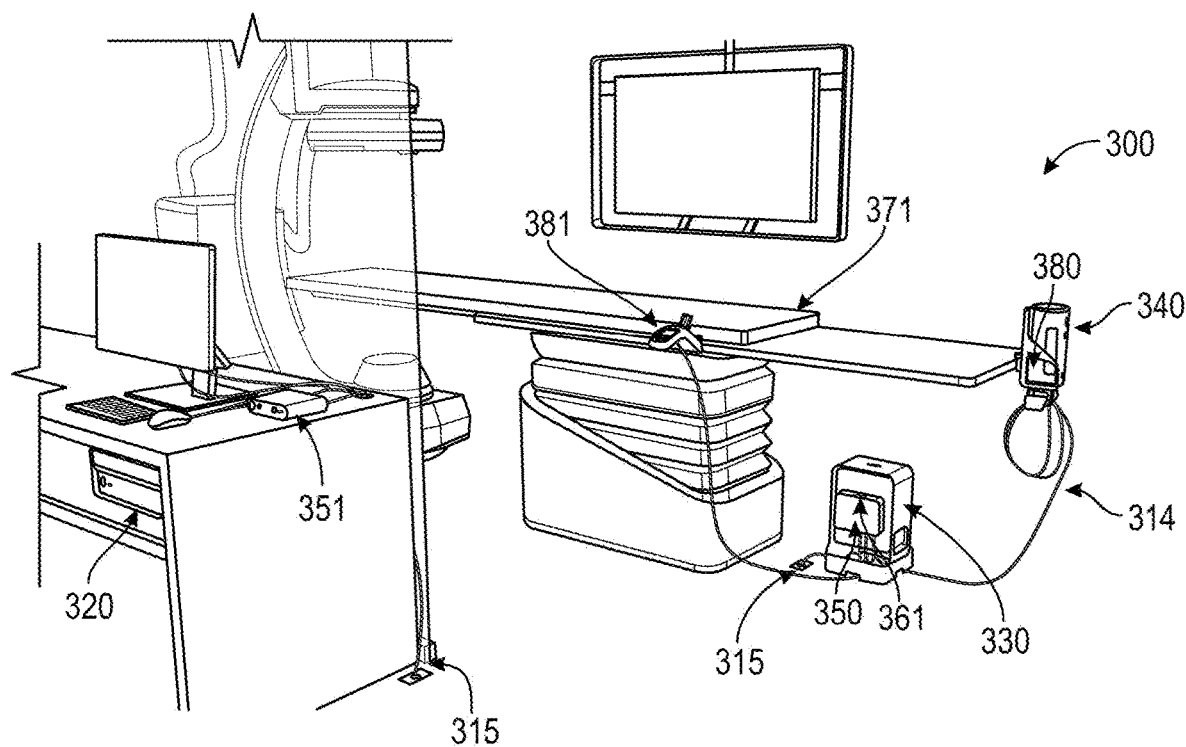
FIG. 3C is another diagram of the system of FIG. 3A.

FIGS. 3A-3C illustrate an example wherein the modular imaging acquisition and processing system 300 may include a processing engine 320, a digital imaging engine 330, imaging peripherals 340, and a hub 350. Such modular components may be used in connection with an imaging catheter 311, etc. to obtain data from a patient 321. The modular system may be positioned with respect to other components in the patient procedure environment, such as on a support 371, a first link 314 between the imaging peripherals 340 and the digital imaging engine 330, a second link 315 between the hub 350 and the remote processing engine 320, a sterile environment user interface 381, a network system 316, an angiography system 317, light indicators 361-363. The system 300 of FIG. 3B is configured to allow similar remote and proximal positioning of different system components as otherwise described herein with different embodiments. When configured as a system, the processing engine 320, the angiography system 317, and the network system 316 may be located in a separate control room.

As seen in FIG. 3B, the imaging peripherals 340 may be mounted on a patient support 371 or other location using a holster 380. The patient support 371 can include a bed, an operating table, or other apparatus suitable for positioning a patient during a data collection procedure.

The processing engine 320, digital imaging engine 330, imaging peripherals 340, hub 350, etc. may be compared with the like components described above in connection with FIGS. 1-2.

As shown in FIG. 3A-3C, the system 300 has various features relating to the ability to position the various components relative to the patient 321 during a data acquisition procedure. Given that the patient 321 may be on the support 371 during the data collection procedure, the support 371 can serve as a frame of reference. In this example, the patient procedure environment may be divided into a sterile field and a non-sterile field. The patient 321 may sit or lay on a portion of the support 371 in a sterile field of the patient procedure environment. The data collection procedure may take place in large part within the sterile field. Additionally, the imaging catheter 311 and the sterile environment user interface 381 may also be within the sterile field of the patient procedure environment. In some other examples, the sterile environment user interface 381 may be located in the non-sterile field. During the data acquisition procedure, the imaging catheter 311 may be inserted into the patient 321. The imaging catheter 311 may be connected to the imaging peripherals 340 and/or separate catheter controls. During the procedure, as depicted in FIG. 3A, the imaging peripherals 340 may be removed from the holster 380 and brought into the sterile environment of the patient procedure environment to connect to the imaging tool.

The processing engine 320 and the angiography system 317 may be positioned outside of the patient procedure environment. The processing engine 320 may be connected to a hospital network 316. The hospital network 316 may include one or more data exchange connections that may be wired, optical, wireless, etc. Various network topologies, cable arrangements, and data routing techniques can be used to facilitate the operation of the modular system. The hospital network 316 may be configured to interconnect computing systems allowing for the exchange of data between authorized physicians, such as for review of patient files, transmission of patient images for a second opinions, etc.

The processing engine 320 may be connected to the angiography system 317 and receive data from the angiography system 317 without the need for a remote power supply in the vicinity of the angiography system. Though these connections are depicted as a wired connection, the connection may also be wireless. The processing engine 320 may remain connected to a power source.

The sterile environment user interface 381 may be directly or indirectly coupled to the processing engine 320, such as by way of one or more communication links and other components. In the example shown, the sterile environment user interface 381 is directly coupled to hub 350, which is further coupled to the processing engine 320. The communication links may be, for example, high bandwidth connections such as an optical, copper, or any other type of connection. Input/output devices, such as a keyboard, mouse, monitor, etc., may provide an interface for an operator to enter commands for the image acquisition tools, processing engine 320, or other components of the modular system. For example, a physician in the sterile environment can manipulate input controls of the sterile environment user interface 381 to adjust data acquisition parameters, adjust patient parameters, perform steps of a workflow, etc. The physician can observe output from the sterile environment user interface 381, such as audible or visible cues guiding an image acquisition workflow, image data, etc. While the sterile environment user interface 381 is illustrated as a type of hand-operated manual input device, it may additionally or alternatively include a microphone for receiving voice commands, an image/object recognition unit for recognizing gestures, a display or speakers for outputting information, etc.

While only the sterile environment user interface 381 is illustrated in FIGS. 3A-3B, it should be understood that other types of user interfaces may be included in the modular system. For example, the modular system may be set up with two or three user interfaces for use by two or three separate users. In some examples, there may be a physician within the sterile field of the patient procedure room. As illustrated in FIG. 3A-3B, the physician may control the intravascular imaging tool using the sterile environment user interface 381 within the sterile field of the patient procedure room. Additionally, there may be at least one technician that may use at least one remote user interface. For example, there may be a technician using a remote user interface connected to the processing engine or angiography system. The remote user interface may be located with the processing engine and the angiography system in a separate room. As another example, there may be a technician in the patient procedure room using a cart user interface connected to the digital imager and/or imaging peripherals. The cart user interface may be docked on a mobile cart. The user interfaces may each include any one or more of a variety of types of input/output devices, such as a monitor, a mouse, a keyboard, a touchscreen, a joystick, etc. The user interfaces may communicate with each other. Additionally, the user interfaces may display the same images and information to the different users, or each user interface may display different information, such as different images, different input options, etc.

The hub 350, the digital imager 330 and the imaging peripherals 340 may be outside of the sterile field. The hub 350 and the digital imager 330 may be positioned underneath the support. The hub 350 is connected to the processing engine 320 via the communication and power link 315. The link 315 may be routed outside of the patient procedure environment though the floor of the procedure room, as shown in FIGS. 3B-3C. The link 315 may transmit data and power signals between the processing engine 320 and the hub 350. The hub 350 is configured to transmit the data and power signals to the other components of the modular imaging acquisition and processing system 300, such that the processing engine 320 may transmit power and signals to components within the patient procedure environment between data acquisition procedures. This near constant power signal allows for operators to quickly prepare the system 300 for use without having to power up between procedures. As depicted in FIG. 3C, hub 350 may be connected through link 315 to a secondary hub 351 outside the procedure environment. In some examples, additional processing may happen at secondary hub 351. In some examples, secondary hub 351 may be connected to the processing engine through a separate link, not link 315. The secondary hub 351 may be used to connect the modular components to the processing engine 320. In some examples, the secondary hub 351 may be utilized when the processing engine 320 is in a remote closet. For example, the secondary hub may be used to connect remote user interfaces, such as a monitor, keyboard, mouse, etc., to the processing engine.

To set up the catheter lab more efficiently, in one embodiment, the digital imager 330 may be integrated with the hub 350 underneath the support 371. The integrated digital imager 330 and hub 350 apparatus reduced clutter in the patient procedure environment. Additionally, a single link 314 may route analog and digital data and power signals between the digital imager 330 and the imaging peripherals 340. In one embodiment, the imaging peripherals 340 may be positioned on the support 371 by the holster 380 when not in use, as shown in FIG. 3B. In another example, the imaging peripherals 340 may be connected to the holster 380 while connected to the imaging catheter. The imaging peripherals 340 connects to the holster 380 by mechanical fit. For example, the holster 380 may form a receptacle sized and shaped corresponding to a housing for the imaging peripherals 340, such that the imaging peripherals 340 can be inserted into the holster 380 and retained therein until it is removed to perform the procedure. Engaging the imaging peripherals with the holster may be assisted through the use of placement mechanisms, such as magnets, interlocking mechanical features, or a sliding rail system. For example, one or more magnets having a first polarity may be fixed on an inner surface of the holster and one or more corresponding magnets having an opposing polarity may be fixed on an outer surface of the imaging peripherals, such that the magnets on the imaging peripherals engage the magnets on the holster to help retain the imaging peripherals in place within the holster. In another example, the holster may have grooves and a housing of the imaging peripherals may have retractable arms that interlock into the grooves when placed into the holster. In yet another example, the holster may have a track and the imaging peripherals may have a rail configured to slide into the rail.

Using a single link 314 to couple the imagine peripherals to the digital imager will allow the user to quickly set up the imaging peripherals 340 without having to connect multiple, additional cables. As such, this provides for quick and reliable connection, reducing setup time and reducing possibility for communication errors. The holster 380 provides for secure and accurate positioning of the imaging peripherals, thereby conserving space in the procedure environment and reducing a possibility of damage to the peripherals.

There may also be light indicators 361-363 on the modular components. The light indicators 361-363 may communicate status of the components to the user, such that the user can quickly and efficiently identify a status of each component and troubleshoot any issues. Though the light indicators 361-363 are depicted on the hub 350, digital imager 330 and the imaging peripherals 340, all components of the modular imaging acquisition and processing system 300 may be individually equipped with light indicators. Moreover, while light indicators are illustrated in the present example, in other examples other types of indicators may be used. For example, such other indicators may provide audible feedback, haptic feedback such as vibrations or the like, etc.

Figure 4A:
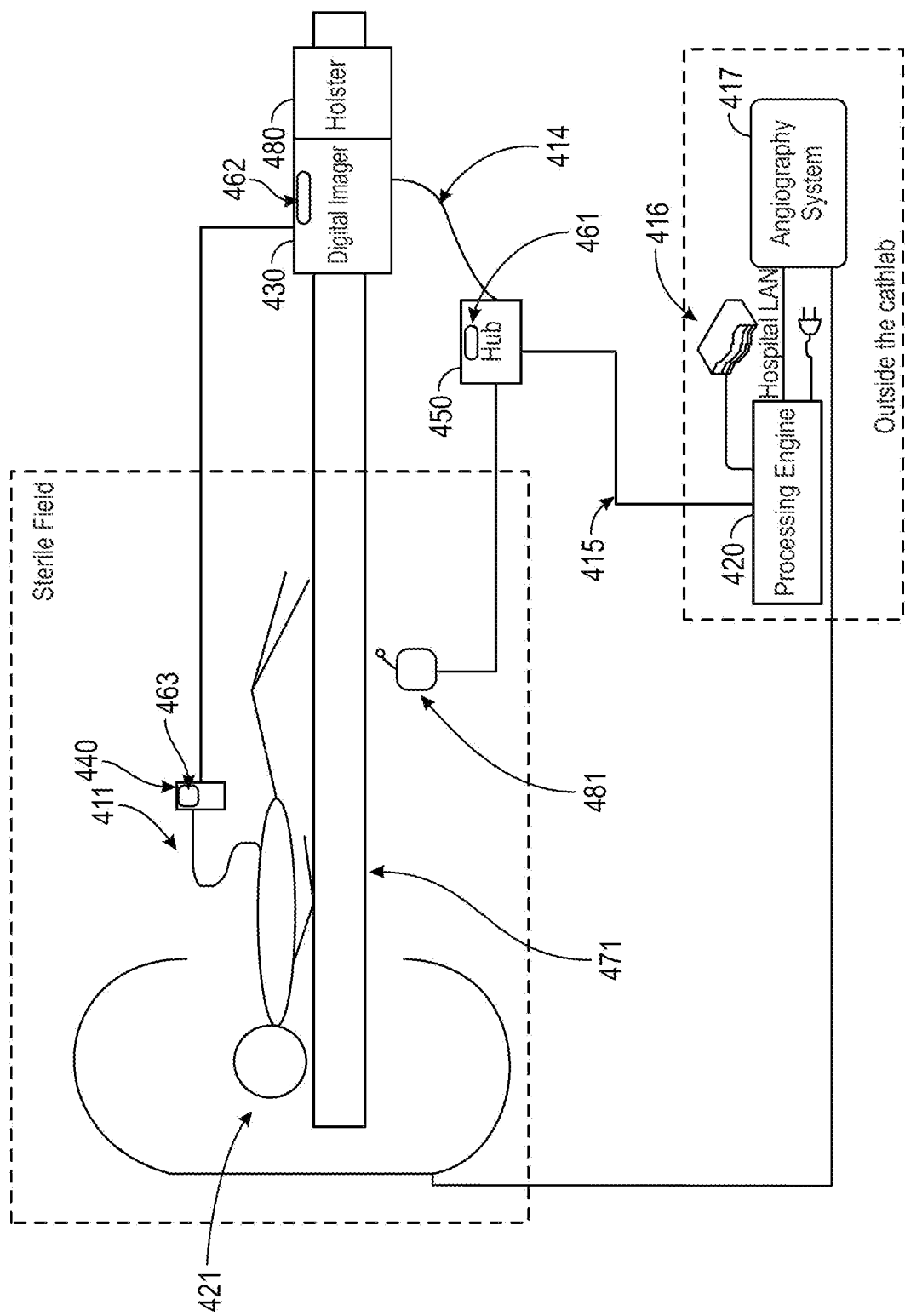
FIG. 4A is a pictorial diagram illustrating an example modular image acquisition and processing system with an integrated imaging peripherals and digital imager apparatus according to aspects of the disclosure.
Figure 4B:
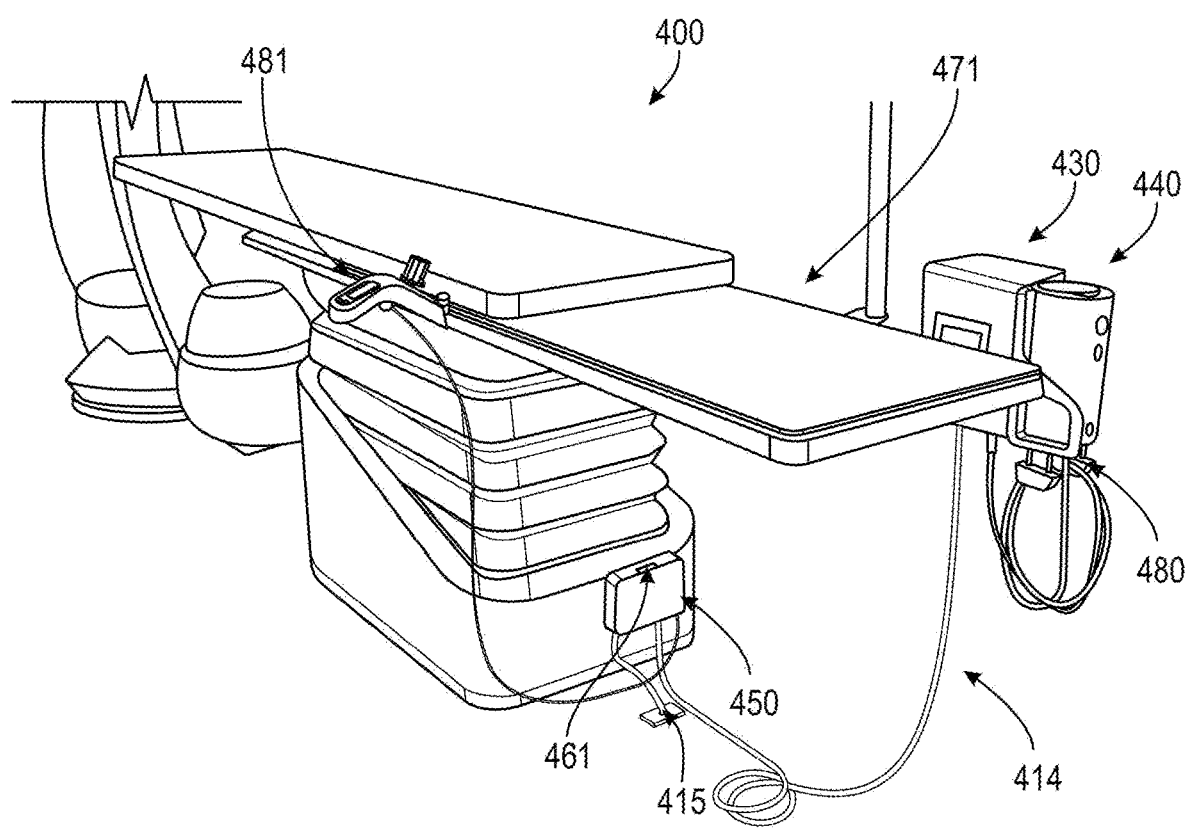
FIG. 4B is a diagram of the system of FIG. 4A.
Figure 4C:
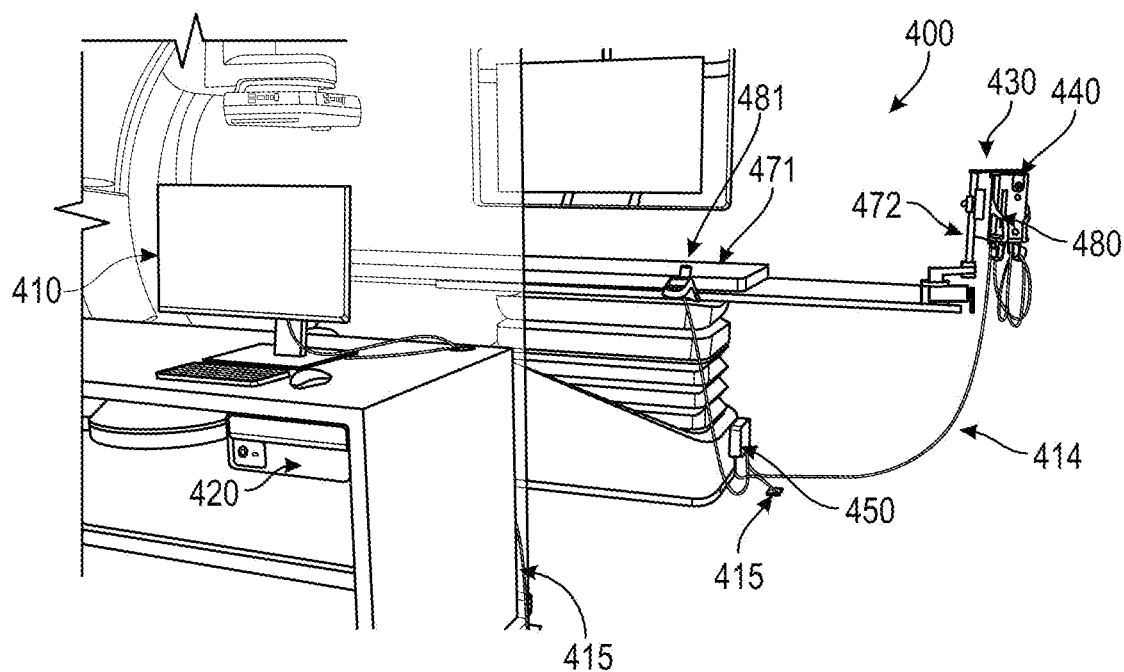
FIG. 4C is another diagram of the system of FIG. 4A.

Referring to FIGS. 4A-C, the modular imaging acquisition and processing system 400 may include a processing engine 420, a digital imaging engine 430, holster 480, imaging peripherals 440, a hub 450. Such modular components may be used in connection with an imaging catheter 411. The imaging peripherals 440 would be taken off the holster 480 and placed in the sterile field to guide the catheter into the body and obtain data from a patient 421. The modular system may be positioned with respect to other components in the patient procedure environment, such as a support 471, a first link 414, a second link 415, a sterile environment user interface 481, a network system 416, an angiography system 417, light indicators 461-463. The system 400 of FIGS. 4A-C is configured to allow similar remote and proximal positioning of different system components as otherwise described herein with different embodiments. When configured as a system, the processing engine 420, the angiography system 417, and the network system 416 may be located in a separate control room.

As further shown in FIG. 4B, another depiction of the modular imaging acquisition and processing system 400, similar to that shown in FIG. 4A. As shown, in some examples, the modular image acquisition and processing system 400 may include a sterile environment user interface 481, a digital imaging engine 430, imaging peripherals 440, a hub 450, and a holster 480. The modular system may be positioned with respect to the other components in the patient procedure environment, such as a support 471, a first link 414, a second link 415, and light indicator(s) 461.

As shown in FIG. 4A-4C, the system 400 has various features relating to the ability to position the various components relative to the patient 421 during a procedure. Given that the patient 421 may be on the support 471 during the data collection procedure, the support 471 can serve as a frame of reference. In this example, the patient procedure environment may be divided into a sterile field and a non-sterile field. The patient 421 may on the portion of the support 471 in a sterile field of the patient procedure environment. The data collection procedure may take place in large part within the sterile field. Additionally, the imaging catheter 411, the imaging peripherals 440, the sterile environment user interface 481 may also be within the sterile field of the patient procedure environment. Alternatively, the sterile environment user interface 481 may be located in the non-sterile field. During the data acquisition procedure, the imaging catheter 411 may be inserted into the patient 421. The imaging catheter 411 may be connected to the imaging peripherals 440. In this example, the imaging peripherals 440 would be removed from the holster 480 and brought into the sterile field of the patient procedure environment to be connected to the imaging catheter 411. In another example, the imaging peripherals 440 could remain anchored to the holster 480 while connected to the imaging catheter 411. The imaging peripherals 440 may include, for example, an input interface in communication with a motor, a rotating mechanism, a pullback mechanism, a steering mechanism, or other mechanisms for moving a catheter through a vessel. Such interface may include manual controls and/or digital controls. In some examples, the imaging peripherals may include features for manipulating an imaging probe and/or features for preparing a vessel for imaging. By way of example only, such features may include a beam splitter, a purge port, optical switches, electrical receivers, etc.

The modular system may be set up with multiple user interfaces for use with multiple users. For example, the modular system may be set up with two or three user interfaces for use by two or three separate users. In some examples, there may be a physician within the sterile field of the patient procedure room. As illustrated in FIG. 4A-C, the physician may control the intravascular imaging tool using the sterile environment user interface 481 within the sterile field of the patient procedure room. Additionally, there may be at least one technician that may use at least one remote user interface 410, as depicted in FIG. 4C. For example, there may be a technician using a remote user interface 410 connected to the processing engine 420 or angiography system 417. The remote user interface 410 may be located with the processing engine and the angiography system in a separate room. As another example, there may be a technician in the patient procedure room using a cart user interface connected to the digital imager and/or imaging peripherals. The cart user interface may be docked on a mobile cart. The user interfaces may each include any one or more of a variety of types of input/output devices, such as monitors, a mouse, keyboard, touchscreens, joysticks, etc. The user interfaces may be communicatively coupled with each other. The user interfaces may display the same images and information to the different users, or each user interface may display different information, such as different images, different input options, etc.

The processing engine 420 and the angiography system 417 may be positioned outside of the lab environment. The processing engine 420 may be connected to the angiography system and transmit both data and power signals to the angiography system 417. The processing engine 420 may be connected to a network system 416. The hospital network 431 may include one or more data exchange connections that may be wired, optical, wireless, etc. Various network topologies, cable arrangements, and data routing techniques can be used to facilitate the operation of the modular system. The hospital network 431 may be configured to interconnect computing systems allowing for the exchange of data between authorized physicians, such as for review of patient files, transmission of patient images for a second opinions, etc. The processing engine 420 may be connected to the angiography system 417 and receive data from the angiography system 417 without the need for a remote power supply close to the angiograph. Though these connections are depicted as a wired connection, the connection may also be wireless. The processing engine 420 may remain connected to a power source.

Control signals from the processing engine may be sent to a remote user interface by way of a communication link 415, such as an optical link. Input/output devices, such as a keyboard, mouse monitor, etc., may provide an interface for an operator to enter commands for the processing engine 420.

The sterile environment user interface 481 may be directly or indirectly coupled to the processing engine 420, such as by way of one or more communication links and other components. In the example shown, the sterile environment user interface is directly coupled to hub 450, which is further coupled to the processing engine 420. The communication links may be, for example, high bandwidth connections such as an optical link, or any other type of connection. Input/output devices, such as a keyboard, mouse monitor, etc., may provide an interface for an operator to enter commands for the image acquisition tools, processing engine 420, or other components of the modular system. For example, a physician in the sterile environment can manipulate input controls of the sterile environment user interface 481 to adjust data acquisition parameters, adjust patient parameters, perform steps of a workflow, etc. The physician can observe output from the sterile environment user interface 481, such as audible or visible cues guiding an image acquisition workflow, image data, etc. While the sterile environment user interface 481 is illustrated as a type of hand-operated manual input device, it may additionally or alternatively include a microphone for receiving voice commands, an image/object recognition unit for recognizing gestures, a display or speakers for outputting information, etc.

The hub 450, the digital imager 430 and the imaging peripherals 440 may be outside of the sterile field. As described above, the imaging peripherals 440 may be moved into the sterile field when performing a procedure. The hub 450 and the digital imager 430 may be positioned underneath the support. The hub 450 is connected to the processing engine 420 via the link 415. The link 415 may be routed outside of the patient procedure environment though the floor of the procedure room, as shown in FIGS. 4B-4C. The link 415 may transmit data and power signals between the processing engine 420 and the hub 450. The hub 450 is configured to transmit the data and power signals to the other components of the modular imaging acquisition and processing system 400, such that the processing engine 420 may transmit the power signals to components within the patient procedure environment between data acquisition procedures. This near constant power signal allows for the user to quickly prepare the system 400 for use without having to power up between procedures.

To set up the catheter lab more efficiently, in one embodiment, the digital imager 430 may be integrated with the imaging peripherals 440 on the support 471. The integrated digital imager 430 and imaging peripheral 440 apparatus reduces clutter in the patient procedure environment. Additionally, a single link 414 may route data and power signals between the digital imager 430 and the imaging peripherals 440. In one embodiment, the imaging peripherals 440 and digital imager 430 may be positioned on the support 471 by the holster 480. In another example, the holster 480 may be positioned underneath the support 471. In yet another example, the holster 480 may be positioned away from the support 471, such as beside the support 471, on an IV pole 472, on a wall of the patient procedure environment, on the boom monitor within the patient procedure environment, or elsewhere in the patient procedure room.

The imaging peripherals 440 may engage with the holster 480 by mechanical fit. For example, the holster 480 may form a receptacle sized and shaped corresponding to a housing for the imaging peripherals 440, such that the imaging peripherals 440 can be inserted into the holster 480 and retained therein until it is removed. According to some examples, an electronic port within the holster 480 may be used to communicatively couple the imaging peripherals 440 with other components of the system, such as the digital imager 430, hub 450, etc. For example, a port on the holster 480 may engage with a port on a housing of the imaging peripherals 440 when the imaging peripherals 440 are inserted into the holster 480. The interconnection of such ports may establish an electrical coupling able to transmit power and/or data between components. The holster 480 may be coupled to further components, such as through ports, cables, or other electrical connections, and as such may establish a connection between the imaging peripherals 440 and such further components. Engaging the imaging peripherals with the holster may be assisted through the use of placement mechanisms, such as magnets, interlocking mechanical features, or a sliding rail system. For example, there may be magnets having one polar charge on the holster and magnets having an opposing polar charge on the imaging peripherals. In another example, the holster may have grooves and the imaging peripherals may have retractable arms that interlock into the grooves when placed into the holster. In yet another example, the holster may have a track and the imaging peripherals may have a rail configured to slide into the rail. This process will allow the user to quickly set up the imaging peripherals 440 and digital imager without having to connect multiple, additional cables. Additionally, the user will be able to spend less time orienting the imaging peripherals 440 as the holster 480 will facilitate correct positioning. In some examples, while not in use, the imaging peripherals 440 may be anchored in the holster 480, as depicted in FIGS. 4B-C. During the procedure, the imaging peripherals 440 may be removed from the holster 480 to be connected to the imaging tool within the sterile environment, as depicted in FIG. 4A.

The module components may include one or more indicators, such as light indicators 461-463. The light indicators 461-463 may communicate status of the components to the user, such that the user can quickly and efficiently identify a status of each component and troubleshoot any issues. Though the light indicators 461-463 are depicted on the hub 450, digital imager 430 and the imaging peripherals 440, all components of the modular imaging acquisition and processing system 400 may be individually equipped with light indicators. Moreover, while light indicators are illustrated in the present example, in other examples other types of indicators may be used. For example, such other indicators may provide audible feedback, haptic feedback such as vibrations or the like, etc.

Referring to FIG. 5A, in one example the modular imaging acquisition and processing system 500 may include a processing engine 520, a digital imaging engine 530, imaging peripherals 540, and a hub 550. Such modular components may be used in connection with an imaging catheter 511 and imaging peripherals 540, to obtain data from a patient 521. The modular system may be positioned with respect to other components in the patient procedure environment, such as a support 571, a first link 515, a second link 516, at least one light indicator 561, a network system 516, an angiography system 517, an imaging catheter 511, imaging peripherals 540, a boom monitor 590, sterile environment user interfaces 581 and 582, cart user interface 583, and a patient 521. The system 500 of FIG. 5 is configured to allow similar remote and proximal positioning of different system components as otherwise described herein with different embodiments. When configured as a system, the processing engine 520, the angiography system 517, and the network system 516 may be located in a separate control room.

As further shown in FIG. 5B, another depiction of the modular imaging acquisition and processing system 500, similar to that shown in FIG. 5A. As shown, in some examples, the modular image acquisition and processing system 500 may include a remote user interface unit 510, a digital imaging engine 530, imaging peripherals 540, a hub 550, a hub extender 551, and a holster 580. The modular system may be positioned with respect to the other components in the patient procedure environment, such as a support 571, a first link 515, at least one light indicator 561, a boom monitor 590, sterile environment user interface 581, and a cart user interface 583. The processing engine 520 and remote user interface 510 may be in a separate room, divided by a structure, such as wall 522.

As shown in FIGS. 5A-5C, the system 500 has various features relating to the ability to position the various components relative to the patient 521 during a procedure. Given that the patient 521 may be on the support 571 during the data collection procedure, the support 571 can serve as a frame of reference. In this example, the patient procedure environment may be divided into a sterile field and a non-sterile field, by a dividing structure, such as wall 522. The patient 521 may on the portion of the support 571 in a sterile field of the patient procedure environment. The data collection procedure may take place in large part within the sterile field. The imaging catheter 511, the imaging peripherals 540 the user interface modules 581 and 582, and the hub 550 may also be within the sterile field of the patient procedure environment. Alternatively, the sterile environment user interfaces 581 and 582 modules and the hub 550 may be located in the non-sterile field. During the data acquisition procedure, the imaging catheter 511 may be inserted into the patient 521. The imaging catheter 511 may be connected to the imaging peripherals 540, which may include catheter controls. During the procedure, the imaging peripherals may remain on the cart 584 while connected to the imaging catheter 511. In another example, the imaging peripherals 540 may be moved into the sterile field of the patient procedure environment to be connected to the imaging catheter 511. In yet another example, as shown in FIG. 5B the imaging peripherals 540 may be separated into multiple housings, where some of the imaging peripherals may move into the sterile field to be connected to the imaging catheter 511, while the rest of the imaging peripherals remain on the cart 584.

The processing engine 520 and the angiography system 517 may be positioned outside of the patient procedure environment. The processing engine 520 may be connected to the angiography system and receive data signals from the angiography system 517 without the need for a remote power supply close to the angiograph. The processing engine 520 may be connected to a network system 516. The hospital network 531 may include one or more data exchange connections that may be wired, optical, wireless, etc. The hospital network 531 may be configured to interconnect computing systems allowing for the exchange of data between authorized physicians, such as for review of patient files, transmission of patient images for a second opinions, etc. The processing engine 520 may be electrically and/or communicatively connected to the angiography system 517. According to some examples, the processing engine 520 may transmit data and/or power signals to the angiography system 517. Though these connections are depicted as a wired connection, the connection may also be wireless. For example, the connection may be established through a wireless local area network or other type of network using WiFi, Bluetooth, ultra-wideband, or any other type of wireless communication technology. The processing engine 520 may remain connected to a power source.

Control signals from the processing engine are sent to the remote user interface 510 by way of a communication link, such as an optical link. Input/output devices, such as a keyboard, mouse monitor, etc., may provide an interface for an operator to enter commands for the processing engine 520.

The modular system may be set up with multiple user interfaces for use with multiple users. For example, the modular system may be set up with two or three user interfaces for use by two or three separate users. In some examples, there may be a physician within the sterile field of the patient procedure room. As illustrated in FIG. 5A-5C, the physician may control the intravascular imaging tool using the sterile environment user interface 581 or 582 within the sterile field of the patient procedure room. The sterile environment user interface may transmit signals to the boom monitor 590 within the sterile field of the patient procedure room. Additionally, there may be at least one technician that may use at least one other user interface. For example, there may be a technician using the remote user interface 510 connected to the processing engine 520 or angiography system 517. As shown in FIGS. 5A-5C, the remote user interface 510 may be located with the processing engine 520 and the angiography system 517 in a separate room. As another example, there may be a technician in the patient procedure room using a cart user interface 583 connected to the digital imager 530 and/or imaging peripherals 540. The cart user interface may be docked on a mobile cart 584. Further, the cart user interface 583 may share a link transmitting serial communications between the digital engine 530 and/or the imaging peripherals 540. The user interface devices may each include any one or more of a variety of types of input/output devices, such as monitors, a mouse, a keyboard, a touchscreen, a joystick, etc. The user interfaces may be communicatively with each other. The user interfaces may display the same images and information to the different users, or each user interface may display different information, such as different images, different input options, etc.

The digital imager 530, the cart user interface 583 and the imaging peripherals 540 may be outside of the sterile field. The digital imager 530, the cart user interface 583 and the imaging peripherals 540 may be positioned on a mobile apparatus that may be quickly interchanged between various catheter labs, such as cart 584. The cart user interface may communicate with the processing engine through the same controller that interfaces the digitizer. The cart 584 may remain outside of the sterile field of the patient procedure environment and connect to the other components of the modular system 500 via a removable connection to the hub 550. The hub 550 may be positioned on or underneath the support 571. The hub 550 may be permanently affixed to the support 571. In some examples, the hub 550 may be removably mounted to support 571, underneath the support 571, or anywhere else in the patient procedure environment. The hub 550 may be connected to a hub mount by a mechanical fit. For example, the hub mount may form a receptacle sized and shaped corresponding to a housing for the hub 550, such that the hub 550 can be inserted into the hub mount and retained therein until it is removed. Additionally, the docking process may be assisted through the use of placement mechanisms, such as magnets, interlocking mechanical features, or a sliding rail system. For example, there may be magnets having one polar charge on the hub mount and magnets having an opposing polar charge on the hub. In another example, the hub mount may have grooves and the hub may have retractable arms that interlock into the grooves when placed into the hub mount. In yet another example, the hub mount may have a track and the hub may have a rail configured to slide into the rail.

The hub 550 may have one or more connection ports, such as a first connection port, a second connection port, and a third connection port. The hub 550 is configured to transmit the data and power signals to the other components of the modular imaging acquisition and processing system 500, such that the processing engine 520 may transmit the power signals to components within the patient procedure environment between and during data acquisition procedures. This near constant power signal allows for the user to quickly prepare the system 500 for use without having to power up between procedures. Additionally, the hub 550 may be configured to receive a single link 593 from the mobile apparatus, through the third connection port. The link 593 may transmit data and power between the hub 550 and the digital imager 530 and imaging peripherals 540.

The hub 550 may be communicatively coupled to the processing engine 520 at the first connection port via link 515 and 516. The link 515 may transmit data signals between the processing engine 520 and the hub 550. The link 516 may transmit power between the processing engine 520 and the hub 550. The hub 550 may maintain a persistent connection with the processing engine 520 at the first connection port, such that between and during procedures, power signals may be transmitted to the hub 550 through a persistent connection of link 516. The hub 550 may be communicatively coupled to the sterile environment user interfaces 581 and 582 through the second connection port. The sterile environment user interfaces 581 and 582 may transmit data input signals to the other components of the modular system, such as the processing engine 520, digital imager 530, imaging peripherals 540, through the second connection port of the hub 550. The hub may maintain a persistent power connection between the sterile environment user interfaces 581 and 582 and the hub 550 through the second connection port, such that power signals may be transmitted through the hub to the sterile environment user interfaces 581 and 582 between data acquisition procedures. Alternatively, the links 515 and 516 may be transmitted over one or more cables between the processing engine 520 and the hub. According to other examples, a hub extender may be used to establish the connection between the hub 550 and the digital imager 530 and imaging peripherals 540. According to further examples, the hub extender may be used in place of the hub 550. For example, the hub extender may have a fixed connection to the processing engine 520, such that when the plug and socket of the hub extender are engaged, the hub extender completes a connection between the processing engine 520 and the imaging peripherals 540 and digital imager 530.

Alternatively, as shown in FIGS. 5B-5C, the hub 550 may be connected to a hub extender 551. In this configuration, the hub 550 is connected to the remote processing engine and another connection method links the hub to a separate housing. The separate housing may be a hub extender 551. The hub extender may have a socket configured to receive the plug from the digital imager 530 that is inserted into the socket. Both power and data signals are transmitted between the digital imager 530 and the hub extender 551, described more fully below regarding FIG. 9A-9B. The hub extender 551 allows for the hub 550 to be located further away from the digital imager 530 and imaging peripherals 540, allowing for a more organized patient procedure environment. The hub extender 551 could also be directly connected to the processing engine 520, without the need for hub 550.

There may also be a light indicator 561 on the hub 550 and/or hub extender 551. The light indicator 561 may communicate status of the components to the user, such that the user can quickly and efficiently identify the status of each component and troubleshoot any issues. Though the light indicator 561 is depicted on the hub 550, all components of the modular imaging acquisition and processing system 500 may be individually equipped with light indicators.

Conventionally, imaging peripherals and a processing engine may be packaged in the form of a mobile cart that can be transported from one lab into another in the hospital when the need arises. With this conventional configuration, a multitude of connections are made to the cart prior to the imaging procedure. The cart needs to be connected to power source within the procedure room. To import patient specific data, such as the name of the patient, the intervening physician, and other parameters necessary to uniquely identify the procedure, the cart must be connected to the hospital's network. In order to correlate results from the intravascular imaging procedure with simultaneously captured angiographic images, the cart must be connected to the angiography system. Using the current configuration, the mobile cart is not within the sterile field of the procedure room, thus the cart must be attached to user interface devices, such as joysticks and/or touch screens, so the user may control the imaging tools. Thus, when the mobile imaging cart is brought into the procedure room to perform intravascular diagnosis, the technician in charge will have to spend time connecting the cart independently to a power outlet, angiograph video feed, hospital LAN, bed monitor, and any user interface devices in use. This is a timeconsuming endeavor which can lead to delays and mistakes. Specifically, after the system is wheeled in, the cart must be plugged into a power outlet, and the technician must wait until the system is powered up before they can start setting up the system for the procedure. This introduces several minutes delay to the start of the procedure. Also, power outlets are often difficult to access in the procedure room and may be located away from the procedure table creating tripping hazards for the procedure room personnel. Additionally, connections to the angiograph, the boom monitor, the hospital network, and the user interface devices all require separate cables and demand attention to detail. Often, given the pressure to speed up the procedure, the technician may neglect to perform a connection, and this introduces further delays while the system attempts to diagnose the problem.

The example modular system described herein is advantageous over conventional mobile cart configurations as it facilitates seamless connections and expedites pre-procedure preparations, thereby reducing the time between entering the procedure room and the system being procedure-ready. For example, the system described in the example of FIG. 5 would introduce a small, rugged connection system, such as in the hub or hub extender, conveniently stationed within the procedure room. The connection system may be positioned at the edge of the bed, or elsewhere in the procedure environment. In this configuration, the imaging mobile cart may be coupled with the entire modular system by inserting a single cable into the connection system when wheeled into the procedure lab. This connection system carries both power and data communications between components. As such, the coupling of the connection system allows the imaging engine to be ready for use in seconds. Moreover, it allows for reliable coupling of the digital imager and peripherals to the rest of the modular system, reducing the possibility of errors or failures due to improper connections. The hub and/or the hub extender may maintain a persistent connection with a power source through the processing engine, which would reduce the time required to start up the modular system. This persistent connection would be useful in emergency situations when time and space in the patient procedure room is limited. Moreover, it similarly provides a reliable connection, as the persistent coupling can be maintained between procedures, thereby reducing a potential for misconnections or mishandling of the couplings.

Figure 6:
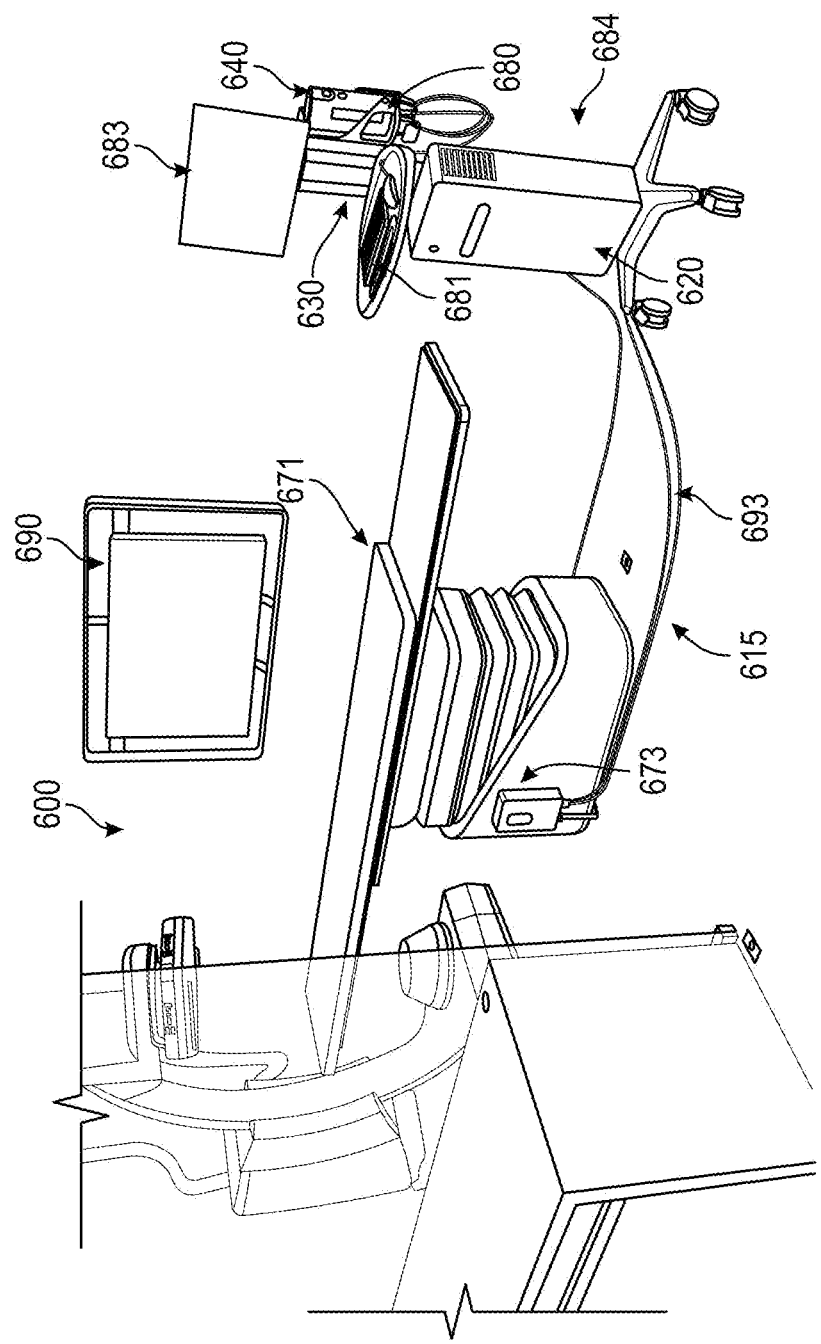
FIG. 6 is a diagram of a possible configuration of the system according to aspects of the disclosure.

Referring to FIG. 6, in one example the modular imaging acquisition and processing system 600 may include a processing engine 620, a digital imaging engine 630, and imaging peripherals 640. In some configurations, there may be a hub inside the processing engine 620. The modular system may be positioned with respect to other components in the patient procedure environment, such as a support 671, a first link 615, imaging peripherals 640, a boom monitor 690, cart user interface 681, and cart monitor 683. The system 600 of FIG. 6 is configured to allow similar remote and proximal positioning of different system components as otherwise described herein with different embodiments.

As shown in FIG. 6, the system 600 may include a cart 684 equipped with the processing engine 620, a hub, the digital imagine engine 630, cart user interface 681, cart monitor 683, and holster 680. The holster 680 may be configured to receive the imaging peripherals 640, similar to the holster described with respect to FIG. 5B. One benefit of a fully mobile solution, as shown in FIG. 6, is that the user can perform an OCT case in a lab with no installed OCT components. In some examples, the cart 684 and all components may be communicatively connected to the procedure room via a support interface 673. The support interface may connect the components on cart 684, including the processing engine 620, hub, the digital imaging engine 630, cart user interface 681, cart monitor 683, and the holster 680. The support interface 673 may receive and send signals to the connected components and the procedure room. In some examples, additional processing may occur at support interface 673. As depicted in FIG. 6, a remote processing room may not be needed in the described modular system where the processing engine may be placed on a cart.

Figure 7:
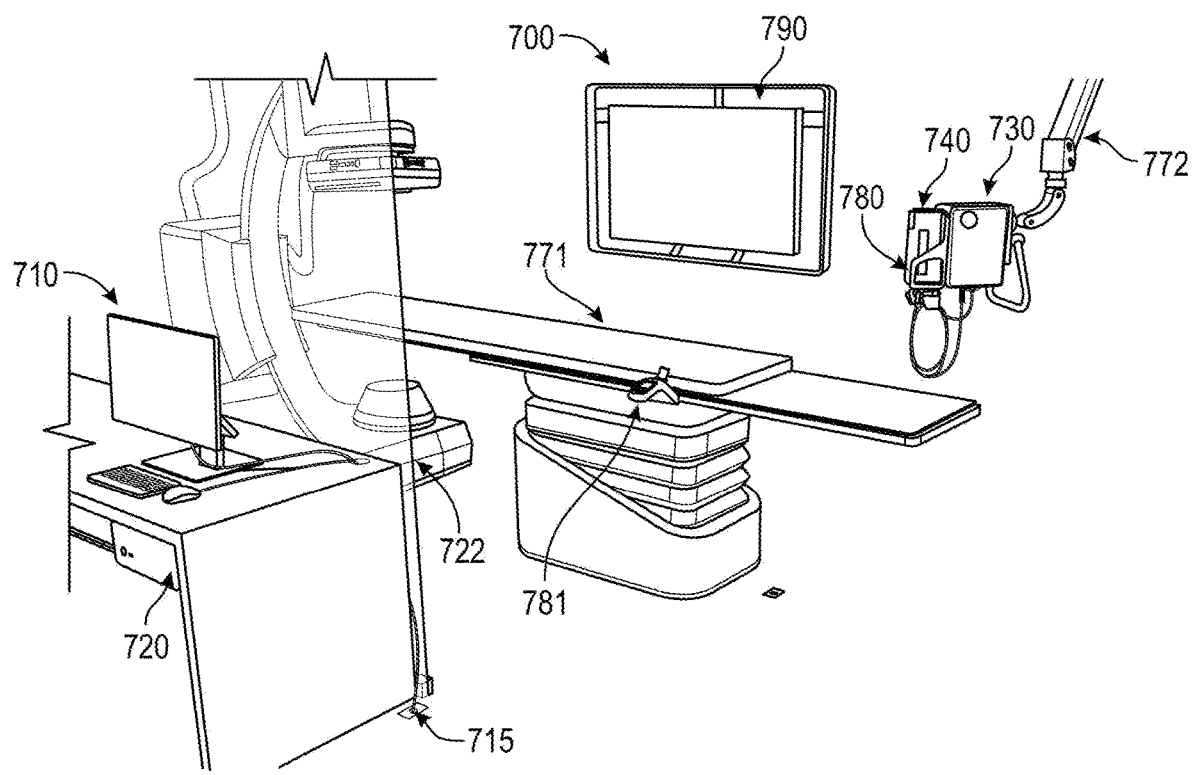
FIG. 7 is a diagram of a possible configuration of the system according to aspects of the disclosure.

Referring to FIG. 7, in yet another example, the modular imaging acquisition and processing system 700 may include a processing engine 720, a digital imaging engine 730, a holster 780, and imaging peripherals 740. The modular system may be positioned with respect to other components in the patient procedure environment, such as a support 771, a sterile environment user interface 781, a link 715, and a remote user interface 710. The system 700 of FIG. 7 is configured to allow similar remote and proximal positioning of different system components as otherwise described herein with different embodiments. When configured as a system, the processing engine 720, and the remote user interface 710 may be located in a separate control room and connected to the patient procedure environment through link 715.

As depicted in FIG. 7, the digital imaging engine 730, holster 780 and imaging peripherals 740 may be positioned remotely from the patient support 771. In some examples, the digital imaging engine 730, holster 780 and imaging peripherals 740 may be connected to the rest of the system 700 via a ceiling mounted arm 772. In some embodiments the ceiling mounted arm may include wired connections within the arm that facilitate a connection of the imaging engine 730 and imaging peripherals 740 to the system 700. By concealing the wires and cords that facilitate the connection of the imaging engine 730 and imaging peripherals 740 to the modular components of system 700, clutter in the patient procedure environment is reduced. In some embodiments, the imagining engine 730 and imaging peripherals may be connected to modular components of system 700 via wireless connection.

In some examples, there may be a hub mounted on arm 772. The hub may enable connectivity between the mounted components and components inside and outside of the procedure room. For example, the hub may enable a connection between the digital imaging engine 730 and imaging peripherals 740 and the components inside the procedure room, such as the sterile environment user interface 781. Additionally, the hub may enable a connection between the digital imaging engine 730 and imaging peripherals 740 and the components outside the procedure room, such as the processing engine 720.

Figure 8:
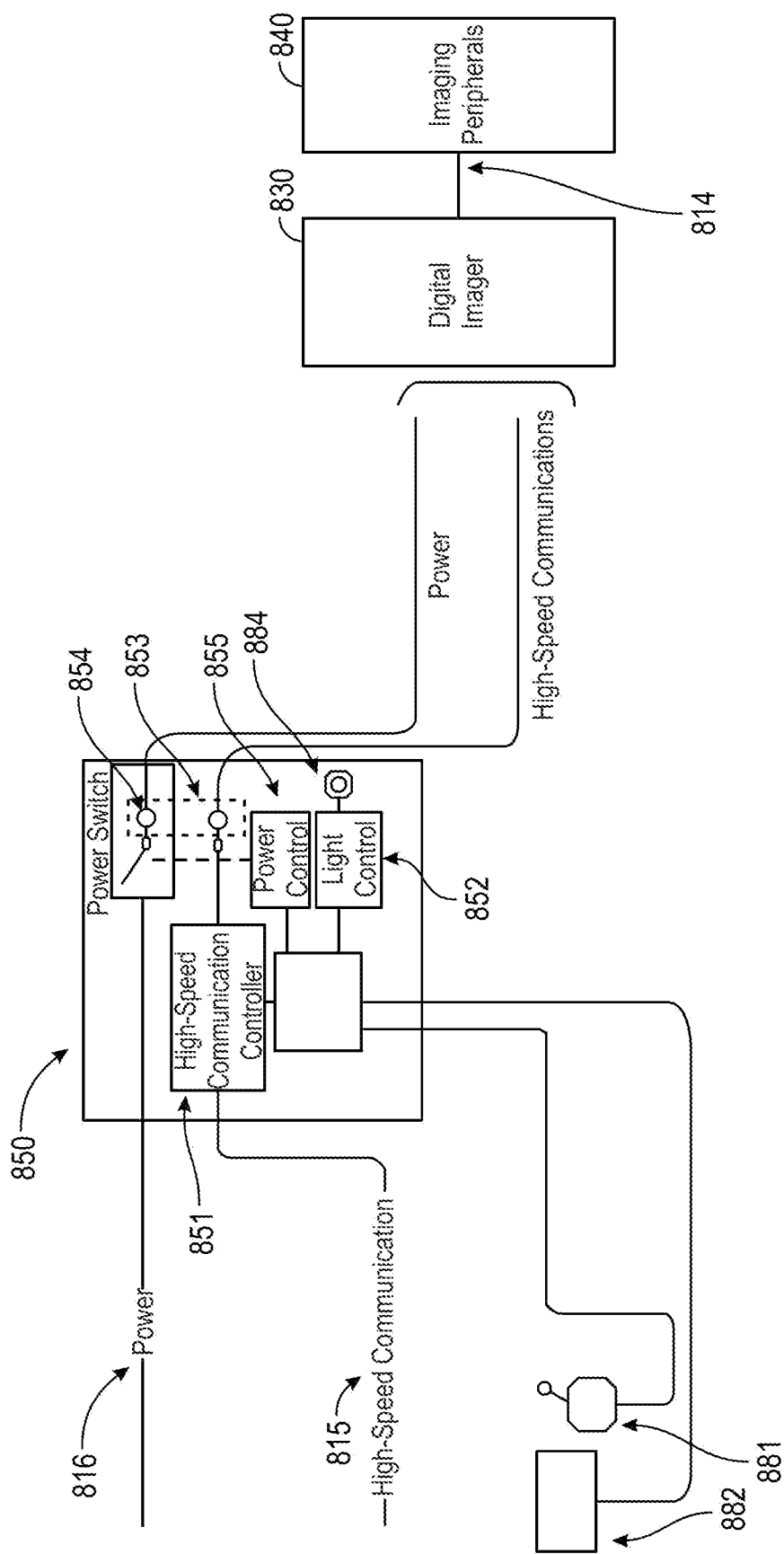
FIG. 8 is a pictorial diagram illustrating the content and connections of a hub according to aspects of the disclosure.

Referring to FIG. 8, in one embodiment a hub 850 may include a controller 851, a lighting control module 852, at least one indicator 864, a first input 853, and a second input 854. The hub 850 may have a single housing containing the controller 851, lighting control module 852, at least one indicator 864, the first input 853, and a second input 854. The hub may be connected to the digital imager 830. The digital imager 830 may be connected to imaging peripherals 840. The digital imager 830 may be connected to the imaging peripherals 840 by a link 814. Alternatively, the digital imager 830 may be connected to the imaging peripherals 840 by wired or wireless connection. Further, in some embodiments, hub 850 may be connected to user interface modules 881 and 882.

The hub 850 is configured to facilitate efficient connection of the digital imager 830 and the imaging peripherals 840. The hub 850 is connected to a remote processing engine via links 815 and 816. The link 815 may transmit data signals between the processing engine 820 and the hub 850. The link 816 may transmit power signals between the processing engine 820 and the hub 850. Between and during procedures, the link 816 may allow power signals to be transmitted to the hub 850 between data acquisition procedures. Alternatively, the links 815 and 816 may be transmitted over one or more cables between the processing engine 820 and the hub 850.

The hub 850 and the digital imager 830 may be connected through the data interface 853 and the power switch 854. The data interface 853 transmits data signals between the digital imager 830 and the hub 850. The power switch 854 transmits power signals between the digital imager 830 and the hub 850. Alternatively, in some examples, the connection between the digital imager 830 and the hub 850 may be through one cable.

The hub 850 contains a power control 855. The power control 855 detects a connection to the digital imager 830 and can activate power switch 854, and vice versa. The power control 855 may prevent the routing of a power signal to the power switch 854 when not in use, such that when no plug is inserted into the power switch 854 no electrical current runs to the power switch 854. This feature provides additional safety precautions by preventing power surges and sparks.

The hub 850 remains connected to the remote processing engine via the data link 815. For example, link 815 may establish a persistent connection between the hub 850 and the remote processing engine, such that link 815 is not disconnected between procedures. The hub 850 contains a communication controller 851 that may transfer signals received from the remote processing engine and the digital imager 830.

The hub 850 may be connected to user interface modules 881 and 882 via a wired connection. The wired connection may be USB, Thunderbolt, or other cables for power and data transmission known in the art. The hub 850 receives commands and data from the user interface modules 881 and 882, then routes the data through the communication controller to other components of the modular system via the processing engine or the digital imager 830. The user interface modules may be any data input devices, such as a touch screen, joystick, control panel, monitor with a keyboard or mouse. Alternatively, in some examples, there may be one or more user interface modules for a user to input commands into the modular system.

In another example there may be a hub extender between the hub 850 and the digital imager 830. The hub extender may facilitate serial communications between the digital imager 830 and the processing engine.

Alternatively, in some examples there may be no hub 850 present and the components of the hub 850, as described in FIG. 8 may be housed and connected in a hub extender. For example, the hub extender may include a controller 851, a lighting control module 852, at least one indicator 864, a first input 853, and a second input 854. The hub extender may have a single housing containing the controller 851, lighting control module 852, at least one indicator 864, the first input 853, and a second input 854. The hub extender may be connected to the digital imager 830. The digital imager 830 may be connected to imaging peripherals 840. The digital imager 830 may be connected to the imaging peripherals 840 by a link 814. Alternatively, the digital imager 830 may be connected to the imaging peripherals 840 by wired or wireless connection. Further, in some embodiments, hub extender may be connected to user interface modules 881 and 882.

The hub extender is configured to facilitate efficient connection of the digital imager 830 and the imaging peripherals 840. The hub extender is connected to a remote processing engine via links 815 and 816. The link 815 may transmit data signals between the processing engine 820 and the hub extender. The link 816 may transmit power signals between the processing engine 820 and the hub extender. The link 816 may allow power signals to be transmitted to the hub extender during data acquisition procedures. The link 816 may be fixed to the hub extender and also fixed to the remote processing engine 820. As such, the procedure environment may be prepared more expeditiously as compared to a system where such connection would need to be established prior to each procedure.

The hub extender and the digital imager 830 may be connected through the data interface 853 and the power switch 854. The data interface 853 transmits data signals between the digital imager 830 and the hub extender. The power switch 854 transmits power signals between the digital imager 830 and the hub extender. The connection between the digital imager 830 and the hub extender may be established through one or multiple cables.

The hub extender may contain a power control 855. The power control 855 detects a connection to the digital imager 830 and can activate power switch 854, and vice versa. The power control 855 may prevent the routing of a power signal to the power switch 854 when not in use, such that when no plug is inserted into the power switch 854 no electrical current runs to the power switch 854. This feature provides additional safety precautions by preventing power surges and sparks.

The hub extender may remain connected to the remote processing engine via the data link 815. For example, link 815 may establish a persistent connection between the hub extender and the remote processing engine, such that link 815 is not disconnected between procedures. The hub extender may contain a communication controller 851 that may transfer signals received from the remote processing engine and the digital imager 830.

The hub extender may be connected to user interface modules 881 and 882 via a wired connection. The wired connection may be USB, Thunderbolt or other data transmission cables. The hub extender receives commands and data from the user interface modules 881 and 882, then routes the data through the communication controller to other components of the modular system via the processing engine or the digital imager 830. The user interface modules may be any data input devices, such as a touch screen, joystick, control panel, monitor with a keyboard or mouse. Alternatively, in some examples, there may be one or more user interface modules for a user to input commands into the modular system.

Figure 9A:
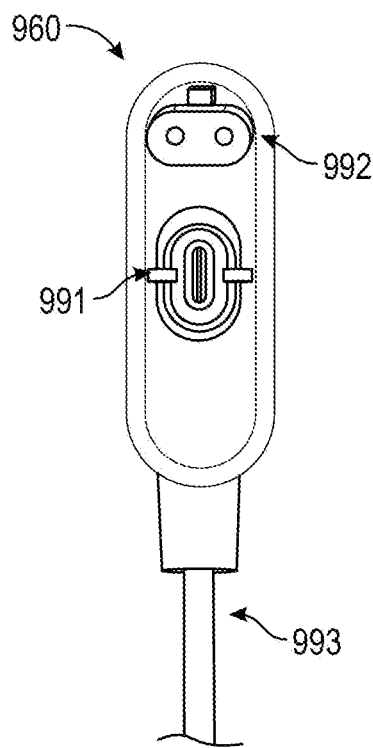
FIG. 9A is a diagram of an example plug portion of an example hub connection system according to aspects of the disclosure.
Figure 9B:
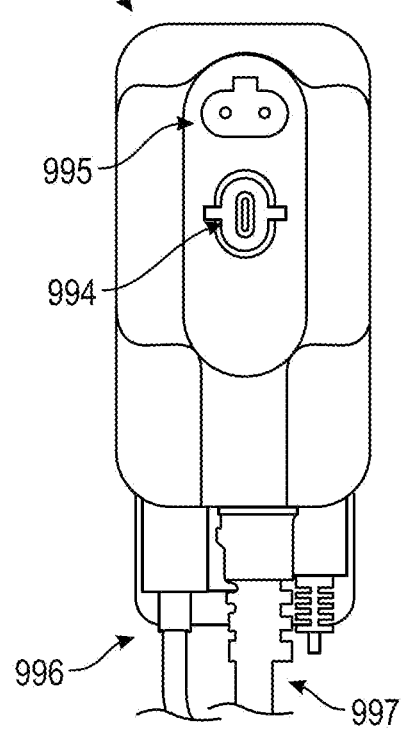
FIG. 9B is a diagram of an example socket portion of the hub connection system according to aspects of the disclosure.

Referring to FIGS. 9A-B, the digital imager may include a plug 960, having a first mating surface including a power interface 992 and a data interface 991, and a cable 993 to a digital imaging engine. The system may also include a socket 970, having a second mating surface, including a power receptacle 995 and a data receptacle 994 configured to mate with the power interface 992 and data interface 991, and cables 996 and 997 to a processing engine. Socket 970 may be an integral part of the hub. In alternate example, the socket 970 may be an integral part of a hub extender. When assembled together, the plug 960 and the socket 970 create a hub connection system. The hub connection system serves to connect the hub of the modular system to the digital imager and imaging peripherals.

Referring to FIG. 9A, in some examples, the plug 960 may facilitate a connection between the digital imager and the hub of the modular system via the cable 993. The cable 993 extends from the digital imager. The cable 993 transmits both data and power signals between the digital imager and the hub. Referring to FIG. 9B, in some examples, the socket 970 may facilitate a connection between the digital imager and the hub of the modular system via cables 996 and 997. In another example, the socket 970 may facilitate a connection between the digital imager and the hub extender. Cables 996 and 997 may connect the hub to the processing engine. The cables 996 and 997 may independently transmit data and power signals from a remote processing engine. Alternatively, in some examples, data and power signals between the hub and the remote processing engine may be one or more cables.

In some examples, the hub connection system is configured to transmit a power signal through the power interface 992. The power interface 992 connects to the socket at the power receptacle 995. Similarly, the hub connection system is configured to transmit data signals through the data interface 991. The data interface 991 connects to the socket at the data receptacle 994. The connection may support the Thunderbolt, Ethernet, USB, or other serial communication protocol.

The plug 960 may have a first mating surface that is configured to connect to the second mating surface of the socket 970. The mating surfaces may allow for a robust mechanical fit between the plug 960 and the socket 970. For example, the socket 970 may form a receptacle sized and shaped corresponding to a plug 960, such that the plug 960 can be inserted into the socket 970 and retained therein until it is removed. Moreover, the mating surfaces may facilitate proper orientation of the power interface 992 to the power receptacle 995 and the data interface 991 to the data receptacle 994. The mechanical fit between the plug and the socket may be facilitated by magnets, interlocking mechanical features, or a sliding rail system. For example, there may be magnets having one polar charge on the socket and magnets having an opposing polar charge on the plug. In another example, the socket may have grooves and the plug may have retractable arms that interlock into the grooves when placed into the socket. In yet another example, the socket may have a track and the plug may have a rail configured to slide into the rail. While the faces of the plug 960 and the socket 970 are illustrated as having a particular size, shape and orientation, the connection can be established through the first and second mating surfaces including interfaces not shown.

In another example, the hub may be removable. The hub may be anchored into a hub mount. The hub may be removably docked to a support, underneath the support, or anywhere else in the patient procedure environment. The hub may be connected to the hub mount by a mechanical fit. For example, the hub mount may form a receptacle sized and shaped corresponding to the hub, such that the hub can be inserted into the hub mount and retained therein until it is removed. Engaging the hub with the hub mount be assisted through the use of placement mechanisms, such as magnets, interlocking mechanical features, or a sliding rail system. For example, there may be magnets having one polar charge on the hub mount and magnets having an opposing polar charge on the hub. In another example, the hub mount may have grooves and the hub may have retractable arms that interlock into the grooves when placed into the hub mount. In yet another example, the hub mount may have a track and the hub may have a rail configured to slide into the rail.

In some examples, the hub connection system may be connected to a hub extender where the hub is separate from the plug and socket described above. In this configuration, the hub is connected to the remote processing engine and another connection method links the hub to a separate housing. The separate housing may be a hub extender that has the socket. The plug from the digital imager is inserted into the socket. As described above, power and data signals are transmitted between the digital imager and the hub through the power interface 992 and data interface 991, respectively. The hub extender allows for the hub to be located further away from the digital imager and imaging peripherals. This configuration allows for a more organized patient procedure environment.

In another example, the hub extender may be removable. The hub extender may be anchored into a hub mount. The hub extender may be removably mounted to a support, underneath the support, or anywhere else in the patient procedure environment. The hub extender may be connected to the hub mount by a mechanical fit. For example, the hub mount may form a receptacle sized and shaped corresponding to the hub, such that the hub can be inserted into the hub mount and retained therein until it is removed. Engaging the hub extender with the hub mount may be assisted using placement mechanisms, such as magnets, interlocking mechanical features, or a sliding rail system. For example, there may be magnets having one polarity on the hub mount and magnets having the opposing polarity on the hub extender. In another example, the hub mount may have grooves and the hub extender may have retractable arms that interlock into the grooves when placed into the hub mount. In yet another example, the hub mount may have a track and the hub extender may have a rail configured to slide into the rail.

While a number of example configurations are described above, numerous other configurations of the modular system are possible. By way of example, the digital imager may be within the sterile field of the patient procedure environment. The digital imager may include a digitizer. The digital imager may be coupled to a remote processing engine residing outside the patient procedure environment. The digital imager may be outside of the patient procedure room. The digital imager may be positioned on a mobile cart. The digital imager may be positioned on the support. The digital imager may be positioned on the bed. The digital imager may be positioned under the support. The digital imager may be positioned under the bed. The digital imager may be attached to the boom monitor. The digital imager may be within the same housing as the imaging peripherals. The digital imager may be within the same housing as at least some of the set of imaging peripherals. The digital imager may be in a housing separate from the imaging peripherals. The digital imager may be docked in a holster with the imaging peripherals. The digital imager may be docked separately from the imaging peripherals. The digital imager may be communicatively coupled to a user interface. The digital imager may be communicatively coupled to a monitor. The digital imager may be communicatively coupled to a touch screen. The digital imager may be communicatively coupled to a user interface on a mobile cart. The digital imager may be communicatively coupled to a user interface at the patient side. The digital imager may be communicatively coupled to a remote user interface. The digital imager may connect to the modular system with or without a hub.

The digital imager may connect to the modular system via a hub. The digital imager may connect to the hub through a single plug. The digital imager may connect the hub through multiple plugs. The digital imager may connect to the hub via a removable connection. The digital imager may connect to the hub via a fixed connection. The hub may be positioned on the support. The hub may be positioned on a bed. The hub may be positioned under the support. The hub may be positioned under the bed. The hub may be within the sterile field of the patient procedure environment. The hub may be outside of the sterile field of the patient procedure environment. The digital imager may connect to the modular system via a hub extender, which may be used in addition to or in place of the hub. The digital imager may connect to the hub extender through a single plug. The digital imager may connect to the hub extender through multiple plugs. The digital imager may connect to the hub extender via a removeable connection. The digital imager may connect to the hub extender via a fixed connection. The hub extender may be positioned on a support. The hub extender may be positioned on a bed. The hub extender may be positioned underneath a support. The hub extender may be positioned on a bed. The hub extender may be positioned underneath a bed. The hub extender may be positioned within the sterile field of the patient procedure environment. The hub extender may be outside of the sterile environment of the patient procedure environment. In any of these examples, the digital imager may include a digitizer. The digital imager may be coupled to a remote processing engine residing outside the patient procedure environment. The digital imager may be outside of the patient procedure room. The digital imager may be positioned on a mobile cart. The digital imager may be positioned on the support. The digital imager may be positioned on the bed. The digital imager may be positioned under the support. The digital imager may be positioned under the bed. The digital imager may be attached to the boom monitor. The digital imager may be within the same housing as the imaging peripherals. The digital imager may be within the same housing as at least some of the set of imaging peripherals. The digital imager may be in a housing separate from the imaging peripherals. The digital imager may be docked in a holster with the imaging peripherals. The digital imager may be docked separately from the imaging peripherals. The digital imager may be communicatively coupled to a user interface. The digital imager may be communicatively coupled to a monitor. The digital imager may be communicatively coupled to a touch screen. The digital imager may be communicatively coupled to a user interface on a mobile cart. The digital imager may be communicatively coupled to a user interface at the patient side. The digital imager may be communicatively coupled to a remote user interface. The digital imager may connect to the modular system with or without a hub.

In some configurations, a hub may be used for interconnection of components of the modular system, such that some components maintained a fixed connection to the hub while other components are quickly connected to the hub prior to a procedure. The hub may be on a cart. The hub may be on a support. The hub may be a bed. The hub may be under a support. The hub may be under a bed. The hub may be within the sterile field of the patient procedure environment. The hub may be outside the sterile field of the patient procedure environment. The hub may be attached to a boom monitor. The hub may have one connection port. The hub may have two connection ports. The hub may have three connection ports. The hub may have four connection ports. The hub may have multiple connection ports. The hub may be connected to a processing engine. The hub may be connected to the processing engine by a removeable connection. The hub may be connected to the processing engine by a fixed connection. The processing engine may be outside of the patient procedure environment. The hub may be connected to the processing engine by a removeable connection. The hub may be connected to the processing engine by a fixed connection. The processing engine may be connected to the hub via one cable. The processing engine may be connected to the hub via two cables. The processing engine may be connected to the hub via multiple plugs. The hub may be connected to the user interfaces within the sterile field of the patient procedure environment. The hub may be connected to the user interfaces by a removable connection. The hub may be connected to the user interfaces by a fixed connection. The hub may be connected to user interfaces via one cable. The hub may be connected to the user interfaces via two cables. The hub may be connected to user interfaces via multiple cables. The hub may be connected to a digital imager via a single plug. The hub may be connected to a digital imager and imaging peripherals. The hub may be connected to a digital imager, imaging peripherals, and a user interface.

The hub may be connected to a hub extender. The hub extender may include a plug and socket configuration, or other configuration with mating connections. The hub may be connected to a digital imager via the hub extender. The hub may be connected to a hub extender through a fixed connection. The hub may be connected to a hub extender through a removable connection. The hub extender may be connected to the modular system through a hub. The hub extender may be connected to the modular system without connection to a hub. The hub extender may be on a mobile cart. The hub extender may be positioned on a support. The hub extender may be positioned on a bed. The hub extender may be positioned under the support. The hub extender may be positioned under a bed. The hub extender may be within the sterile field of the patient procedure environment. The hub extender may be outside of the sterile field of the patient procedure environment. The hub extender may be attached to the boom monitor. The hub extender may have one connection port. The hub extender may have two connection ports. The hub extender may have multiple connection port. The hub extender may connect the digital imager to the rest of the modular system. The hub extender may connect the digital imager and the imaging peripherals to the rest of the modular system. The hub extender may connect the digital imager, imaging peripherals, and a user interface to the rest of the modular system.

The hub extender may be used without the hub. The hub extender may include a plug and socket configuration, or other configuration with mating connections. One end of the mating connection may couple with the remote processor while another end of the mating connection couples with the digital imager. The hub extender may be on a mobile cart. The hub extender may be positioned on a support. The hub extender may be positioned on a bed. The hub extender may be positioned under the support. The hub extender may be positioned under a bed. The hub extender may be within the sterile field of the patient procedure environment. The hub extender may be outside of the sterile field of the patient procedure environment. The hub extender may be attached to the boom monitor. The hub extender may have one connection port. The hub extender may have two connection ports. The hub extender may have multiple connection port. The hub extender may connect the digital imager to the rest of the modular system. The hub extender may connect the digital imager and the imaging peripherals to the rest of the modular system. The hub extender may connect the digital imager, imaging peripherals, and a user interface to the rest of the modular system.

Although the present disclosure describes the modular data acquisition system with reference to particular examples, it is to be understood that these examples are merely illustrative and not limiting. It is therefore to be understood that numerous modifications may be made to the illustrative embodiments and that other arrangements may be devised without departing from the spirit and scope of the appended claims.

The invention claimed is:

1. A portable digital imager for processing intravascular diagnostic data, the imager comprising:
    a first interface coupling the digital imager to a set of imaging peripherals;
    an analog imager configured to: receive analog image data from the imaging peripherals;
    a digitizer in communication with the analog imager to convert the analog image data into digital image data;
    a controller in communication with the digitizer, the controller adapted to convert the digital image data to serial communication data; and
    a second interface coupling the digital imager to a communication link configured to transmit the serial communication data to a remote processing engine;
    wherein the portable digital imager is connected to a hub through a connection port on the hub, and
    wherein the connection port includes a power control configured to detect a connection between the hub and the portable digital imager, and, when the power control does not detect the connection at the connection port, the power control is configured to prevent routing of a power signal.

2. The portable digital imager of claim 1, wherein the portable digital imager further comprises a housing,
    wherein, the analog imager, the digitizer and the controller are within the housing.

3. The portable digital imager of claim 2, wherein at least some of the set of imaging peripherals are not within the housing.

4. The portable digital imager of claim 3, wherein the set of imaging peripherals are connected to an imaging tool.

5. The portable digital imager of claim 4, wherein the portable digital imager is removably connected to the remote processing engine, wherein the portable digital imager receives power and data communication from the remote processing engine.

6. The portable digital imager of claim 1, wherein the second interface coupling the portable digital imager to the remote processing engine provides high-speed, serial communications.

7. A modular image acquisition and processing system, comprising:
    a remote processing engine positioned outside of a patient procedure environment;
    a user interface positioned within the patient procedure environment and adapted to receive operational commands from a user;
    a hub positioned within the patient procedure environment, comprising,
        a first connection port configured to maintain a persistent connection to the remote processing engine positioned outside of the patient procedure environment, wherein the persistent connection between the hub and the remote processing engine is permanently fixed; and
        a further connection port configured for connection to a portable digital imager in the patient procedure environment;
    a set of imaging peripherals; and
    the portable digital imager, comprising:
        a first interface coupling the digital imager to a set of imaging peripherals;
        an analog imager configured to receive analog image data from the imaging peripherals;
        a digitizer in communication with the analog imager to convert the analog image data into digital image data;
        a controller in communication with the digitizer, the controller adapted to convert the digital image signal to serial communication data; and
        a second interface coupling the digital imager to a communication link configured to transmit the serial communication data to a remote processing engine.

8. The modular imaging acquisition and processing system of claim 7, wherein the hub further comprises at least one second connection port configured to maintain a persistent coupling to one or more monitors and controls in the patient procedure environment.

9. The modular image acquisition and processing system of claim 7, wherein the modular image acquisition and processing system further comprises at least one light indicator on at least the remote processing engine, the hub, the portable digital imager, or the set of imaging peripherals, wherein the lighting indicators provides at least the connectivity or power status of at least the remote processing engine, the hub, the portable digital imager, or the set of imaging peripherals.

10. The modular image acquisition and processing system of claim 7, wherein the further connection port is configured for fixed connection to a hub extender, the hub extender comprising a removable connection to the portable digital imager, wherein the hub extender comprises a power control, wherein the power control can detect a connection at the further connection port.

11. The modular image acquisition and processing system of claim 7, wherein the user interface comprises a monitor on a mobile cart, wherein the monitor is adapted to display at least intravascular image data, and where said monitor communicates with the processing engine via the same controller that interfaces with the digitizer.

12. The modular imaging acquisition and processing system of claim 7, wherein at least one of the set of imaging peripherals, the digital imager and a monitor are positioned on a mobile cart.

13. The modular image acquisition and processing system of claim 7, wherein at least one of the set of imaging peripherals and the digital imager are positioned on a support.

14. The modular image acquisition and processing system of claim 7, wherein the hub is positioned on a support.

15. The modular image acquisition and processing system of claim 7, wherein the hub is positioned underneath the support.

16. The modular image acquisition and processing system of claim 7, wherein the second interface of the digital imager connects to the further connection port of the hub.

17. The modular image acquisition and processing system of claim 7, wherein the hub receives power from the processing engine through the first connection port.

18. The modular image acquisition and processing system of claim 7, wherein the set of imaging peripherals comprise at least one of an imaging system engine, a light source, an interferometer, an ultrasound imaging system, an ultrasound source, an ultrasound transducer, a blood pressure sensor, a blood temperature sensor or a blood flow sensor.

19. The modular image acquisition and processing system of claim 7, wherein the hub further comprises a power control, wherein the power control can detect a connection at the further connection port.

20. A hub positioned within a patient procedure environment, comprising:
- a first connection port configured to maintain a persistent connection to a remote processing engine positioned outside of the patient procedure environment, wherein the persistent connection between the hub and the remote processing engine is permanently fixed;
- at least one second connection port configured to maintain a persistent coupling to one or more monitors or controls in the patient procedure environment;
- a third connection port configured for connection to a portable digital imager in the patient procedure environment;
- wherein the third connection port contains a power control;
- wherein the power control is configured to detect a connection at the third connection port; and
- a communications control.

21. The hub of claim 20, wherein the hub receives power from the remote processing engine through the first connection port.

22. The hub of claim 20, wherein the hub is positioned on a support in the patient procedure environment.

23. The hub of claim 22, wherein the hub is removably attached to a hub mount on the support.

24. The hub of claim 20, wherein the hub is positioned under a procedure table in the patient procedure environment.

25. The hub of claim 20, further comprising a hub extender.

26. The hub of claim 25, wherein the third connection port is configured for fixed connection to the hub extender, the hub extender comprising a removable connection to the portable digital imager.

27. The hub of claim 26, wherein the hub extender is positioned on a support in the patient procedure environment.

* * * * *